(12) United States Patent
Bae et al.

(10) Patent No.: US 11,501,350 B2
(45) Date of Patent: Nov. 15, 2022

(54) DEVICE AND METHOD FOR MEDIATING HEAVY EQUIPMENT AND SYSTEM USING THE SAME

(71) Applicants: Seok-Ho Bae, Seoul (KR); Han-Jun Bae, Seoul (KR); Hyun-Woong Bae, Seoul (KR)

(72) Inventors: Seok-Ho Bae, Seoul (KR); Han-Jun Bae, Seoul (KR); Hyun-Woong Bae, Seoul (KR)

( * ) Notice: Subject to any disclaimer, the term of this patent is extended or adjusted under 35 U.S.C. 154(b) by 779 days.

(21) Appl. No.: 16/339,720

(22) PCT Filed: Dec. 24, 2018

(86) PCT No.: PCT/KR2018/016549
§ 371 (c)(1),
(2) Date: Apr. 4, 2019

(87) PCT Pub. No.: WO2019/132462
PCT Pub. Date: Jul. 4, 2019

(65) Prior Publication Data
US 2021/0334869 A1    Oct. 28, 2021

(30) Foreign Application Priority Data
Dec. 27, 2017  (KR) .......................... 10-2017-0180852

(51) Int. Cl.
*G06Q 30/00* (2012.01)
*G06Q 30/06* (2012.01)
(Continued)

(52) U.S. Cl.
CPC ....... *G06Q 30/0619* (2013.01); *G06F 16/285* (2019.01); *G06F 16/953* (2019.01); *G06Q 30/0623* (2013.01)

(58) Field of Classification Search
None
See application file for complete search history.

(56) References Cited

U.S. PATENT DOCUMENTS 9,779,318 B1 * 10/2017 Wilbert .................. G06K 9/325
10,116,861 B1 * 10/2018 Graham ............... G06K 9/3241

FOREIGN PATENT DOCUMENTS

| JP | 2003281397 A | 10/2003 |
|---|---|---|
| KR | 20010089003 A | 9/2001 |

(Continued)

OTHER PUBLICATIONS

Mi, Shenglong, Extraction of Product Information Object for Trustworthiness, Nov. 1, 2014, 2014 IEEE 11th International Conference on e-Business Engineering, pp. 252-257 (Year: 2014).*

*Primary Examiner* — Jeffrey A. Smith
*Assistant Examiner* — Timothy J Kang
(74) *Attorney, Agent, or Firm* — Renaissance IP Law Group LLP

(57) ABSTRACT

An intermediary device for mediating a transaction of used heavy equipment may be provided. The intermediary device may provide a semitransparent photographing guideline including guidance on a photographing portion and a photographing angle for photographing a heavy equipment image on a heavy equipment portion basis to a sale terminal device. When the intermediary device receives heavy equipment sales request information including at least one of a nameplate image and a registration certificate image of the heavy equipment to be sold, an appearance image, first heavy equipment information, heavy equipment location information, and a desired sale price from the sale terminal device, the intermediary device may recognize at least one of the nameplate image and the registration certificate image to extract second heavy equipment information. The intermediary device may compare the first heavy equipment (Continued)

information with the second heavy equipment information to authenticate the first heavy equipment information, and calculate an estimated sale price in which a commission and a tax are added to the desired sale price when the first heavy equipment information is successfully authenticated.

6 Claims, 21 Drawing Sheets

(51) Int. Cl.
  *G06F 16/28* (2019.01)
  *G06F 16/953* (2019.01)

(56) References Cited

FOREIGN PATENT DOCUMENTS

| | | | |
|---|---|---|---|
| KR | 20020007132 | A | 1/2002 |
| KR | 20020083955 | A | 11/2002 |
| KR | 20130091369 | A | 8/2013 |
| KR | 20150083465 | A | 7/2015 |
| KR | 20150141243 | A | 12/2015 |
| KR | 20160033270 | A | 3/2016 |

* cited by examiner

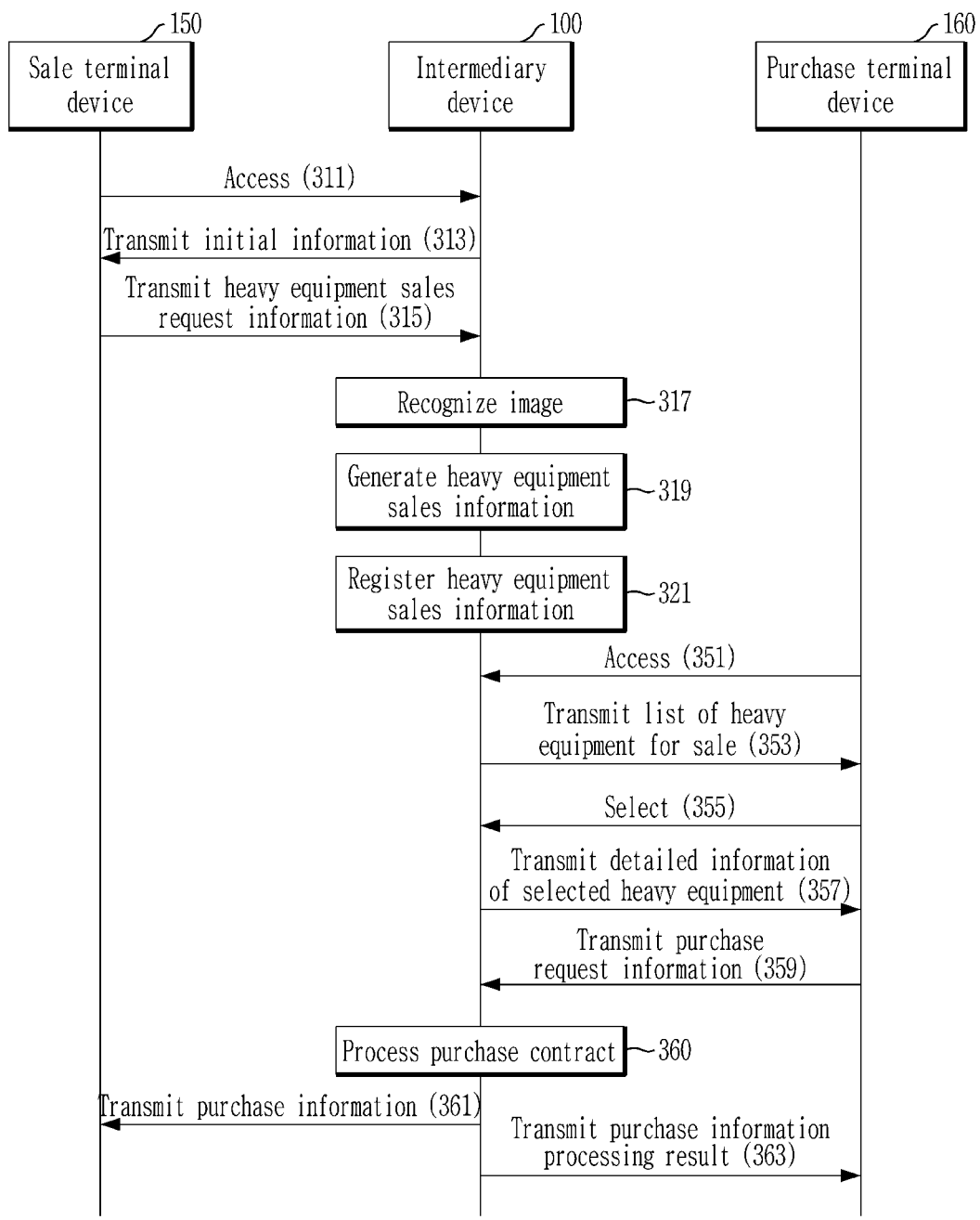

DEVICE AND METHOD FOR MEDIATING HEAVY EQUIPMENT AND SYSTEM USING THE SAME

TECHNICAL FIELD

The present inventive concept relates to a device and method that can mediate used heavy equipment using electronic commerce and a system using the same.

BACKGROUND

Heavy equipment may be used for large-scale works that can dig or transport soil or other materials and may be expensive equipment. Therefore, a transaction of used heavy equipment is active. In general, a heavy equipment owner company or a heavy equipment owner can trade (sell and/or buy) used heavy equipment through a visiting guest, personal connections, or advertisement. That is, in order to sell or buy used heavy equipment, a seller and a buyer should meet and transact, but exchange sales information and purchase information through an off-line to perform a transaction of heavy equipment. However, in an off-line heavy equipment transaction method, because a transaction range is limited to a local area, the seller and the buyer cannot meet more widely and thus a heavy equipment transaction cannot be activated.

DISCLOSURE

Technical Problem

The present inventive concept provides a device and method that can mediate used heavy equipment using electronic commerce and a system using the same.

The present inventive concept further provides a device and method that can generate and display sales information of heavy equipment based on information received from an owner of the heavy equipment and a system using the same.

The present inventive concept further provides a device and a method and a system using the same that can display detailed information of heavy equipment selected by a purchaser and that can perform a purchase processing of heavy equipment based on a purchase request of the purchaser.

Technical Solution

According to an embodiment of the present inventive concept, a system for mediating a transaction of used heavy equipment may be provided. The system may include a sale terminal device for transmitting heavy equipment sales request information including at least one of a nameplate image and a registration certificate image of heavy equipment to be sold, an appearance image, first heavy equipment information, heavy equipment location information, and an estimated sale price; a purchase terminal device for transmitting search information and purchase request information about the heavy equipment; and an intermediary device functionally connected to the sale terminal device and the purchase terminal device.

The intermediary device may provide a semitransparent photographing guideline including guidance on a photographing portion and a photographing angle on a heavy equipment portion basis to the sale terminal device in order to photograph at least one of the nameplate image and the registration certificate image and the appearance image.

When the heavy equipment sales request information is received, the intermediary device may recognize at least one of the nameplate image and the registration certificate image to extract second heavy equipment information and compare the first heavy equipment information and the second heavy equipment information to authenticate the first heavy equipment information.

According to another embodiment of the present inventive concept, a method in which an intermediate device mediates a transaction of used heavy equipment may be provided. The method includes providing a semitransparent photographing guideline including guidance on a photographing portion and a photographing angle for photographing a heavy equipment image on a heavy equipment portion basis to a sale terminal device; recognizing, when heavy equipment sales request information including at least one of a nameplate image and a registration certificate image of heavy equipment to be sold, an appearance image, first heavy equipment information, heavy equipment location information, and a desired sale price is received from the sale terminal device, at least one of the nameplate image and the registration certificate image to extract second heavy equipment information, and comparing the first heavy equipment information and the second heavy equipment information to authenticate the first heavy equipment information; and calculating an estimated sale price in which a commission and a tax are added to the desired sale price, when the first heavy equipment information is successfully authenticated.

According to another embodiment of the present inventive concept, an intermediary device for mediating a transaction of used heavy equipment may be provided. The intermediary device may include a memory; and a processor for controlling the memory.

The processor may provide a semitransparent photographing guideline including guidance on a photographing portion and a photographing angle for photographing a heavy equipment image on a heavy equipment portion basis to a sale terminal device.

When heavy equipment sales request information including at least one of a nameplate image and a registration certificate image of heavy equipment to be sold, an appearance image, first heavy equipment information, heavy equipment location information, and a desired sale price is received from the sale terminal device, the processor may recognize at least one of the nameplate image and the registration certificate image to extract second heavy equipment information.

The processor may compare the first heavy equipment information and the second heavy equipment information to authenticate the first heavy equipment information, and calculates an estimated sale price in which a commission and a tax are added to the desired sale price, when the first heavy equipment information is successfully authenticated.

Advantageous Effects

According to an embodiment of the present inventive concept, when transacting used heavy equipment, a mediation system can provide in real time sale information of heavy equipment, and purchasers can search for in real time sale information of heavy equipment provided in real time. Therefore, sale registration of heavy equipment for sale of a seller and search of heavy equipment for sale of the purchaser can be performed in real time, and a heavy equipment transaction can be performed online.

DESCRIPTION OF DRAWINGS

FIG. 3 is a flowchart illustrating a heavy equipment mediation operation of an intermediary system according to an embodiment of the present inventive concept.

MODE FOR INVENTION

Figure 1:
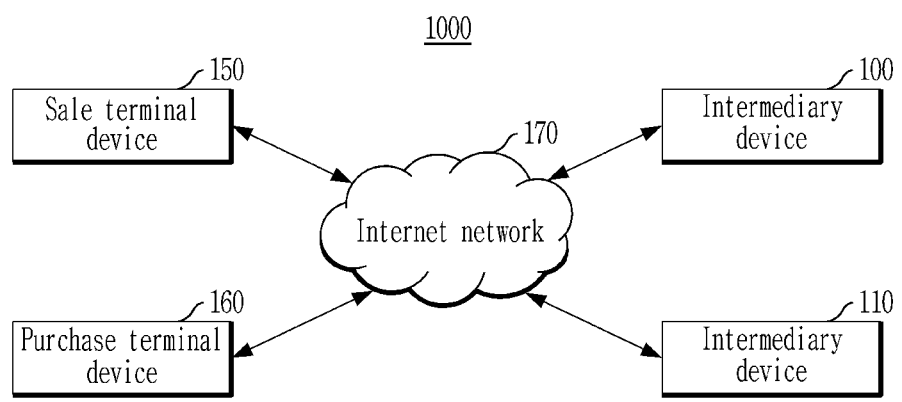
FIG. 1 is a diagram illustrating a system for mediating used heavy equipment according to an embodiment of the present inventive concept.

Hereinafter, embodiments of the present inventive concept will be described in detail with reference to the accompanying drawings so that those skilled in the art can easily carry out the present inventive concept. However, the present inventive concept may be embodied in many different forms and is not limited to the embodiments set forth herein. In order to clearly illustrate the present inventive concept, parts not related to the description are omitted, and like reference numerals designate like elements throughout the specification.

In the present specification, duplicate descriptions are omitted for the same constituent elements.

Further, in the present specification, when it is described that a constituent element is "connected" or "electrically connected" to another constituent element, it should be understood that the element may be "directly connected" or "directly electrically connected" to the other constituent elements or may be "connected" or "electrically connected" to the other constituent elements through a third element. However, in the present specification, when it is described that a constituent element is "directly connected" or "directly electrically connected" to another constituent element, it should be understood that no element may exist between the element and the other constituent elements.

Further, terms used in the present specification are used for describing a specific embodiment and do not limit the present inventive concept.

Further, in the present specification, unless the context otherwise clearly indicates, words used in the singular include the plural, and the plural includes the singular.

Further, in the present specification, a term "comprise" or "have" indicates presence of a characteristic, numeral, step, operation, element, component, or combination thereof described in the specification and does not exclude presence or addition of at least one other characteristic, numeral, step, operation, element, component, or combination thereof.

Further, in the present specification, a term "and/or" includes a combination of a plurality of described items or any item of a plurality of described items. In this specification, 'A or B' may include 'A', 'B', or 'both A and B'.

Further, in the present specification, detailed descriptions of well-known functions and structures incorporated herein may be omitted to avoid obscuring the subject matter of the present inventive concept.

In the present specification, the present inventive concept will be described by exemplifying the case where heavy equipment is used heavy equipment. A 'nameplate image' may be a photographing image of a nameplate (nameplate in which heavy equipment information is written) attached to heavy equipment by a manufacturer when producing the heavy equipment. A 'registration certificate image' may be a photographing image of a registration certificate provided by a government office when purchasing heavy equipment.

FIG. 1 is a diagram illustrating an intermediary system for mediating used heavy equipment according to an embodiment of the present inventive concept.

Referring to FIG. 1, an intermediary system 1000 may include intermediary devices 100 and 110, a sale terminal device 150, and a purchase terminal device 160.

The sale terminal device 150 may transmit information of used heavy equipment to be sold to the intermediary device 100. That is, the sale terminal device 150 may download a used heavy equipment intermediary program (or application) provided by the intermediary device 100 and execute the application to write and transmit sales request information of heavy equipment that may be transacted by the intermediary device 100. The sales request information of the heavy equipment may include a heavy equipment image, heavy equipment information, and sales subsidiary information. The heavy equipment image may include a nameplate image and/or a registration certificate image of the heavy equipment, and appearance images of the heavy equipment. The heavy equipment information may include a heavy equipment name, a heavy equipment type, a model name, a production year, a used time, and the like. The sales subsidiary information may include a desired sale price, location information (e.g., continent/country/city) of the heavy equipment, and special request information of a seller. The sale terminal device 150 may take an image with a moving picture and/or a voice provided by the intermediary device 100. Further, the sale terminal device 150 may input information of the heavy equipment to be sold, and the sale terminal device 150 may generate the input heavy equipment information and images as information of heavy equipment to be sold and transmit the generated heavy equipment information and images to the intermediary device 100.

The purchase terminal device 160 may generate purchase information of the displayed heavy equipment. When the purchase terminal device 160 is accessed to the intermediary device 100, the intermediary device 100 may load initial screen information including some of heavy equipment for sale, and the purchase terminal device 160 may download and display detailed information of the selected (e.g., selected by the user) heavy equipment from the intermediary device 100.

In a state in which sales information of the heavy equipment selected by the user is displayed, the purchase terminal device 160 may request additional information to the intermediary device 100. The purchase terminal device 160 may download and display detailed information of similar heavy equipment downloaded from another site linked to the intermediary device 100 (e.g., heavy equipment of another site linked to the intermediary device 100). Further, the purchase terminal device 160 may transmit purchase request information of the heavy equipment to the intermediary device 100. The purchase request information of the heavy equipment may include heavy equipment information and purchase subsidiary information. The heavy equipment information may include a heavy equipment name, a heavy equipment type, and the like.

The sale terminal device 150 and/or the purchase terminal device 160 may be electronic devices. The electronic device may include at least one of a smart phone, tablet personal computer (tablet PC), mobile phone, video phone, desktop PC, laptop PC, netbook computer, workstation, server, personal digital assistant (PDA), portable multimedia player (PMP), or wearable device. Further, the electronic device may be a home appliance. The home appliances may include at least one of a television, a digital video disk (DVD) player, a set-top box, a home automation control panel, and a security control panel.

The electronic device may include a processor, a memory, a communication unit, a camera unit, an input unit, and a display unit, and other components may be added to these configurations. The memory may store a program for executing an application according to an embodiment of the present inventive concept. For example, the memory may store an application for displaying heavy equipment transaction information downloaded from the intermediary device 100. Further, the memory may store data generated while executing an application. The processor may operate an operating system or an application program to control a plurality of hardware or software components connected to the processor. The communication unit may include a cellular communication module and/or a short-range communication module and perform a communication function with the intermediary device 100 through an Internet network 170. The short-range communication module may include at least one of wireless fidelity (WiFi), Bluetooth, Bluetooth low energy (BLE), Zigbee, near field communication (NFC), magnetic secure transmission, radio frequency (RF), or body area network (BAN). A wireless communication module may include cellular communication that uses at least one of long-term evolution (LTE), LTE advance (LTE-A), code division multiple access (CDMA), wideband CDMA (WCDMA), universal mobile telecommunications system (UMTS), or global system for mobile communications (GSM). The camera unit may obtain a nameplate, a registration certificate, and an appearance image of the heavy equipment. The input unit may include a keyboard or a keypad and generate commands and/or key data or the like by a user. The command may be a command for processing information for selling or purchasing heavy equipment. The display unit may display purchase information or sales information of the heavy equipment provided by the intermediary device 100. The display unit may be a liquid crystal display (LCD), an organic light-emitting diode (OLED) display, an active matrix organic light-emitting diode (AMOLED) display, or the like.

The intermediary device 100 may be connected to the sale terminal device 150 and the purchase terminal device 160 through the Internet network 170. The intermediary device 100 may control a registration operation for performing a customer registration and real name verification function of the sale terminal device 150 and the purchase terminal device 160. The intermediary device 100 may request the sale terminal device 150 to set a transaction acceptance function during the registration operation, and the transaction acceptance function may be set by setting of the sale terminal device 150.

When access of the sale terminal device 150 is recognized, the intermediary device 100 may download information (e.g., moving image or voice guidance) for guiding an input of the heavy equipment sales information. When sales request information of the heavy equipment is received from the sale terminal device 150, the intermediary device 100 may recognize a nameplate and/or a registration certificate image included in the sales request information of the heavy equipment to extract heavy equipment information and compare the extracted heavy equipment information with heavy equipment information written by the user to authenticate the heavy equipment information. When the heavy equipment sales request information is recognized as normal heavy equipment sales request information (e.g., when authentication of the heavy equipment information is successful), the intermediary device 100 may calculate a sale price to which a commission and a tax are added to a desired sale price included in the sales subsidiary information. The intermediary device 100 may generate and register detailed sales information of the heavy equipment based on the authorized heavy equipment information. The detailed sales information of the heavy equipment may include a heavy equipment image and sales subsidiary information. The sales subsidiary information may include a calculated sale price.

When access of the purchase terminal device 160 is recognized, the intermediary device 100 may download initial screen information to the purchase terminal device 160 based on the registered heavy equipment sales information. When search information is received from the purchase terminal device 160, the intermediary device 100 may download heavy equipment sales information of a search item to the purchase terminal device 160. The intermediary device 100 may download detailed sales information of the heavy equipment selected by the purchase terminal device 150 to the purchase terminal device 160. In a state in which detailed sales information of the heavy equipment is selected, when purchase request information of the heavy equipment is received from the purchase terminal device 160, the intermediary device 100 may transmit the purchase request information of the purchase terminal device 160 to the sale terminal device 150 that sells the heavy equipment to perform a heavy equipment transaction operation.

When additional information of the heavy equipment selected by the purchase terminal device 160 is requested, the intermediary device 100 may download sales information of related heavy equipment (e.g., the same/similar heavy equipment) obtained from other linked sites and/or another intermediary device 110 to the purchase terminal device 160. When purchase request information of specific heavy equipment is received from the purchase terminal device 160, the intermediary device 100 may generate and register purchase information of the heavy equipment based on the purchase request information. The linked intermediary device 110 may search for sales information of the heavy equipment in which purchase is requested. When the sale information of the heavy equipment is searched for in another intermediary device 110 or is received from the sale terminal device 150, the intermediary device 100 may notify the purchase terminal device 160 of the sale information.

The intermediary device 100 may provide a business application that may organically connect heavy equipment for sale in real time to transact (e.g., sell and/or purchase) or share.

The intermediary device 100 may recognize and store the heavy equipment information of a nameplate (e.g., aluminum manufacturer nameplate of about 150×100 mm) and/or a heavy equipment registration certificate using a character recognition function. The intermediary device 100 may provide voice guidance for inputting information of heavy equipment (e.g., guidance of an upload procedure by voice, heavy equipment image upload procedure) and recognize the received voice to store heavy equipment information.

The intermediary device 100 may link uploaded heavy equipment information or processed heavy equipment information to another web or another intermediary device 110 and edit the uploaded heavy equipment information or the processed heavy equipment information and make data of the uploaded heavy equipment information or the processed heavy equipment information to provide the heavy equipment information to a user (e.g., the sale terminal device 150, the purchase terminal device 160). Further, the intermediary device 100 may compare and analyze the uploaded heavy equipment information by statistical analysis. For example, when the user sets a desired sale price with reference to the desired sale price average value of a corresponding heavy equipment model, the intermediary device 100 may provide a comparative analysis function that allows the user to set a desired sale price.

While performing a customer registration operation, when real name verification and agreement for use of customer information are set, the intermediary device 100 may perform a sales agent agreement procedure of the heavy equipment.

The intermediary device 100 may perform an operation of registering customer information, an operation of processing heavy equipment sales request information, an operation of processing heavy equipment purchase request information, and the like.

The operation of registering customer information will be described.

The sale terminal device 150 and/or the purchase terminal device 160 may register customer information. The customer information may include required information and optional information. For example, required information (e g, family level) may include a name (Korean/English), phone number (e.g., mobile phone or office phone number), and whether owner or not of heavy equipment, and optional information (e.g., dealership level) may include a resident registration number or a business registration number, an address for registering location information, information on a heavy equipment owner, and the like. After the customer information is registered, the sale terminal device 150 or the purchase terminal device 160 may register intermediation items. For example, the sale terminal device 150 may select a seller item (e.g., sell/palgo item), and the purchase terminal device 160 may select a purchaser item (e.g., purchase/sago item). Further, when customer registration is performed by the sale terminal device 150, the intermediary device 100 may guide insertion of sales agent agreement after real name verification and agreement for use of customer information are made together with execution of an application.

The intermediary device 100 may analyze the input information and give a user rating to the user. For example, the intermediary device 100 may give a family rating to a user who inputs only required information, and a dealership rating may be given to a user who provides a resident registration number, a business registration number, location information, and vehicle owner information in addition to required information. The intermediary device 100 may provide differential information according to a user rating. The intermediary device 100 may give a user rating to the seller or the purchaser to prevent a user from falsely registering heavy equipment and anyone from reading information. For example, when the user registers only a name and uses a heavy equipment mediation application, the user may quickly register heavy equipment for sale, but the provided heavy equipment information may contain erroneous contents. Further, when the seller provides more information on the heavy equipment, heavy equipment sales information having high reliability may be provided to the purchaser. That is, the intermediary device 100 may adjust a user rating (e.g., seller rating) based on fidelity of provided sales information (or an amount and quality of provided sales information). Further, the intermediary device 100 may further subdivide the rating within a dealership rating or a family rating.

When the sale terminal device 150 is connected to the intermediary device 100, the intermediary device 100 may download information that guides an uploading procedure of heavy equipment information for sale to the sale terminal device 150. The guide information may include a moving picture (e.g., animated moving picture clip). The guide information may include images of heavy equipment including a nameplate (e.g., an aluminum nameplate) and/or a vehicle registration certificate attached to the heavy equipment and guidance of a photographing method. Nameplate items of the heavy equipment may include a model name, production year, use time, equipment capacity (e.g., tonnage), work capacity input window, and so on. Further, in the case of a manual input, a guidance screen may be provided so that a model type or an equipment name (e.g., excavator) may be automatically searched for and input by inputting a model name alone. A photographing process of heavy equipment may be guided specifically. For example, setting of a photographing region according to a photographing angle and location of heavy equipment, the number of still images (e.g., up to 15), and the number of movie clips (e.g., up to 2 files) may be set, and a semitransparent photographing guideline for each picture may be provided.

In general, an input of information of heavy equipment for sale is performed by a method in which the seller directly determines and inputs information of heavy equipment for sale. However, the heavy equipment may have a nameplate and/or a vehicle registration certificate marked with heavy equipment information written by a manufacturer. Therefore, a serial number, a vehicle number, and the like may be input through automatic information recognition (e.g., automatic recognition of nameplate information) based on the nameplate and/or the vehicle registration certificate of the heavy equipment. A mounting location of the nameplate of the heavy equipment may vary according to a type of heavy equipment. For example, in the case of an excavator, a nameplate of the excavator may be fixed under a driver's seat and be riveted to prevent it from being pulled out (not to manipulate). Further, in order to accurately provide characteristics of heavy equipment to be sold to the purchaser, it may be preferable that a current state of the heavy equipment to be sold is provided as an image. The intermediary device 100 may provide images of heavy equipment for sale to the purchaser. The heavy equipment image may be provided with moving images (e.g., two) and/or still images (e.g., fifteen). For this, the intermediary device 100 may guide a position of the heavy equipment to be photographed through a pictogram or a dotted line on a screen. For example, when the sale terminal device 150 is a mobile phone, the sale terminal device 150 may sequentially photograph images of heavy equipment to be sold based on the photographing guideline image of the heavy equipment. For example, when a photographing mode is performed by a used heavy equipment mediating application, the sale terminal device 150 may display a guide line of heavy equipment to be photographed on the screen in a translucent manner in the photographing order, and when heavy equipment images of the corresponding screen are photographed, the sale terminal device 150 may display a guideline image of a next step. With such a method, a predetermined number of images may be obtained while the guideline images are sequentially changed in preset order. In this case, in the case of a still image, a specific element such as front/rear/left/right of heavy equipment, upper consumables (e.g., easily aging portion), a rear shape, and an engine may be guided to be photographed.

The sale terminal device 150 may provide sales subsidiary information in addition to heavy equipment information and heavy equipment images. The sales subsidiary information may be classified into required information and optional information. The required information of the sales subsidiary information may include a desired sale price of the heavy equipment, and the optional information of the sales subsidiary information may include setting of a sales period, a current location of the heavy equipment (or delivery place), whether the sales agency or not, or domestic or export preference selection.

The sale terminal device 150 may transmit heavy equipment sales request information including heavy equipment information, a heavy equipment image, and sales subsidiary information based on a guidance message of the intermediary device 100.

The user of the purchase terminal device 160 may transmit purchase request information of the heavy equipment to the intermediary device 100. The purchase terminal device 160 may be connected to the intermediary device 100 by a request of the purchaser. When the connection of the purchase terminal device 160 is recognized, the intermediary device 100 may transmit initial screen information of heavy equipment that can be sold to the purchase terminal device 160. The purchaser may search for heavy equipment that can be purchased using a search word. When entering a search word, the intermediary device 100 may automatically search for and input a model or equipment name (e.g., excavator) of heavy equipment through an input of a model name. When searching for heavy equipment, the intermediary device 100 may provide seller information (e.g., a company name of the intermediary device 100 (e.g., CETEC), contact information, company, and equipment location service). Further, the purchase terminal device 160 may input purchase subsidiary information. The purchase subsidiary information may include required information and optional information. The required information of the purchase subsidiary information may include a desired purchase price, and the optional information of the purchase subsidiary information may include a delivery place, a payment method of the heavy equipment, and the like.

The intermediary system 1000 according to various embodiments of the present inventive concept may provide in real time information of heavy equipment for sale. That is, when heavy equipment for sale is registered by the seller, because the heavy equipment for sale may be searched for by a purchaser, the intermediary system 1000 may process sales and purchase information of heavy equipment for sale in real time. When heavy equipment sales request information is received from the sale terminal device 150, in a profit structure of the intermediary system 1000, a method of automatically adding a transaction fee to a desired sale price of the seller may be used. For example, a sales commission set to a desired sale price of heavy equipment for sale registered in a sale (palgo) screen may be automatically added (e.g., 2 to 3% of the desired sale price, 3% to 30,000 thousand won, 2% from 30,010 thousand won, minimum 300 thousand won/maximum 3,000 thousand won). When the purchaser purchases heavy equipment, the seller's desired sale price may be provided, and when the sale is established, the seller may pay a selling fee. Alternatively, a price in which a sales commission is added to a desired sale price of heavy equipment found on a purchase (sago) screen may be registered, and the purchaser may pay the sale fee. Alternatively, the intermediary system 1000 may add a sales commission set to each of the seller's desired sale price and the purchaser's desired purchase price. Further, the intermediary system 1000 may provide heavy equipment for sale registered therein to another intermediary site (e.g., a domestic/foreign intermediary site) or may provide heavy equipment for sale registered in another intermediary site to the purchaser to receive an intermediary commission. Further, the intermediary system 1000 may provide banner advertisements.

Figure 2:
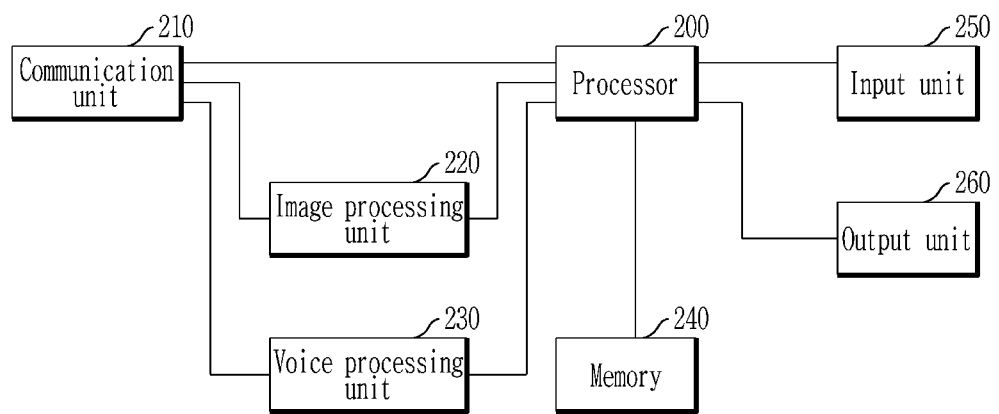
FIG. 2 is a diagram illustrating an intermediary device according to an embodiment of the present inventive concept.

FIG. 2 is a diagram illustrating an intermediary device according to an embodiment of the present inventive concept.

Referring to FIG. 2, the intermediary device 100 may include a processor 200, a communication unit 210, an image processing unit 220, a voice processing unit 230, a memory 240, an input unit 250, and an output unit 260.

The communication unit 210 may communicate with the sale terminal device 150, the purchase terminal device 160, and the another intermediary device 110 through the Internet network 170. The communication unit 210 may include a short-range communication module and/or a wireless communication module. The short-range communication module may include at least one of wireless fidelity (WiFi), Bluetooth, Bluetooth low energy (BLE), Zigbee, near field communication (NFC), magnetic secure transmission, radio frequency (RF), or body area network (BAN). The wireless communication module may include cellular communication that uses at least one of long-term evolution (LTE), LTE advance (LTE-A), code division multiple access (CDMA), wideband CDMA (WCDMA), universal mobile telecommunications system (UMTS), or global system for mobile communications (GSM).

The image processing unit 220 may process a received image. The image processing unit 220 may include a character recognition module for recognizing the received image. The character recognition module may parse an image to recognize a character area in the image, convert the recognized character area into character data, and extract heavy equipment information from the converted character data. For example, the character recognition module may include an optical character recognition (OCR) module. The image processing unit 220 may be embedded in the processor 200.

The voice processing unit 230 may process a received voice. The voice processing unit 230 may include a voice recognition module for recognizing the received voice. The voice recognition module may recognize the received voice to convert the received voice into character data, and extract heavy equipment information from the converted character data. For example, the voice recognition module may include a speech to text (STT) module. The voice processing unit 230 may be embedded in the processor 200.

The memory 240 may store an application (or a program) for performing a heavy equipment transaction operation (or an operation of mediating a heavy equipment transaction) according to embodiments of the present inventive concept. Further, the memory 240 may include a database that stores data generated while executing an application. For example, the memory 240 may include a first database that stores heavy equipment sales information generated by a request from the sale terminal device 150, a second database that stores heavy equipment purchase information generated by a request from the purchase terminal device 160, and a third database that stores heavy equipment sales and purchase information provided by the linked another intermediary device 110.

The input unit 250 may include a keyboard or a keypad and generate a command and/or key data by the user.

The output unit 260 may display purchase information or sales information of the heavy equipment. The output unit 260 may include a liquid crystal display (LCD), a light emitting diode (LED) (e.g., organic light emitting diode (OLED), active matrix organic light emitting diode (AMO-LED)).

The processor 200 may process heavy equipment sales information and heavy equipment purchase information based on the heavy equipment mediation application (heavy equipment mediation program) and control a heavy equipment mediation processing operation according to a purchase request. The processor 200 may be connected to the sale terminal device 150 to perform a sales information processing operation of the heavy equipment and may be connected to the purchase terminal device 160 to perform a purchasing information processing operation of the heavy equipment. The processor 200 may be connected to another intermediary device 110 to perform an operation of processing sales information of the another intermediary device 110 linked to the requested heavy equipment.

FIG. 3 is a flowchart illustrating a heavy equipment mediation operation of an intermediary system according to an embodiment of the present inventive concept. FIGS. 4a to 4k are diagrams illustrating examples of heavy equipment images.

Referring to FIG. 3, the sale terminal device 150 and the purchase terminal device 160 may be in a state registered as a customer in the intermediary device 100.

First, in step 311, when the sale terminal device 150 logs in and accesses to the intermediary device 100, the intermediary device 100 may transmit initial information to the sale terminal device 150 in step 313. Specifically, the sale terminal device 150 may download initial screen information (e.g., including a guidance message for inputting heavy equipment sales request information) from the intermediary device 100. The guidance message included in the initial screen information may include information for guiding an input of heavy equipment information and photographing of the heavy equipment image. Moving picture information may include images of heavy equipment (e.g., nameplate/registration certificate of heavy equipment). For example, as a heavy equipment image, moving pictures (e.g., two) and still pictures (e.g., fifteen) may be registered. A position of heavy equipment to be photographed may be guided through a pictogram of the guidance message or a guide image. When photographing of a still image is guided, photographing may be guided to obtain images of specific elements such as a nameplate of heavy equipment, front/rear/left/right of heavy equipment, upper consumables (e.g., easily aging portions), a rear shape, and an engine. FIGS. 4a to 4k are diagrams illustrating a heavy equipment image when heavy equipment for sale is an excavator.

Figure 4A:
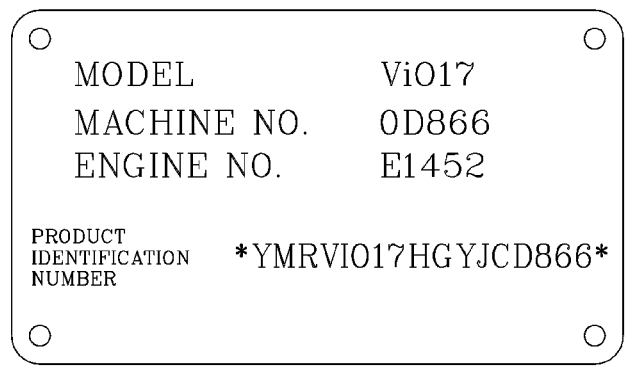
FIGS. 4a, 4b, 4c, 4d, 4e, 4f, 4g, 4h, 4i, 4j, and 4k are diagrams illustrating examples of heavy equipment images.
Figure 4B:
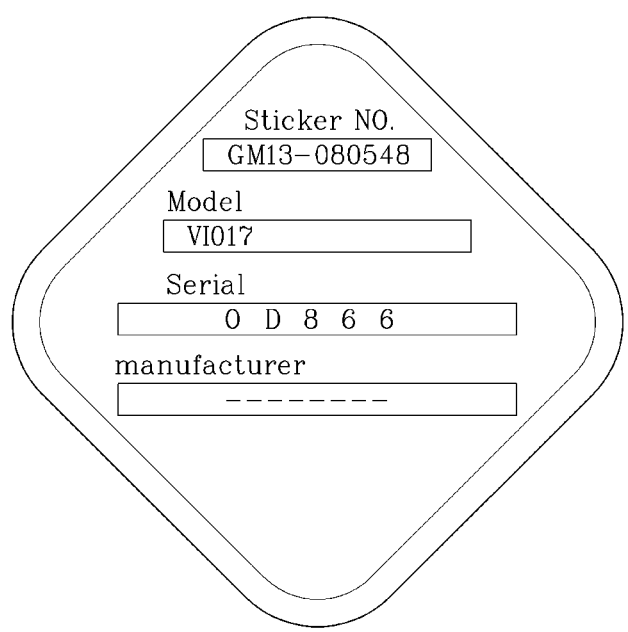
Figure 4C:
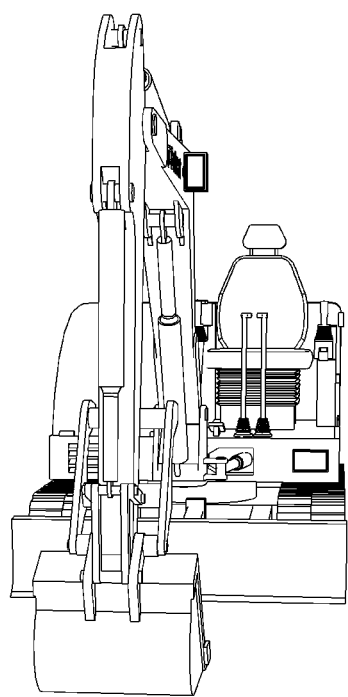
Figure 4D:
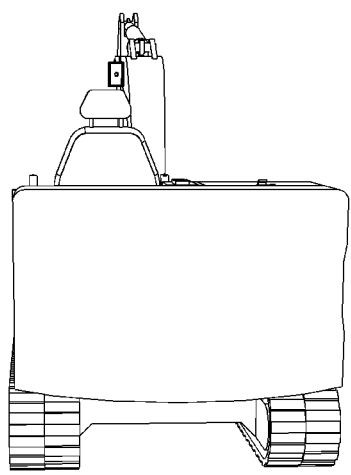
Figure 4E:
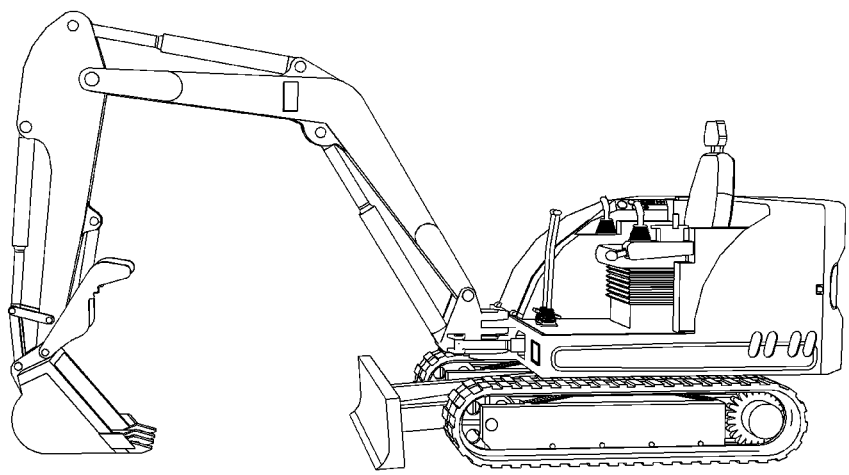
Figure 4F:
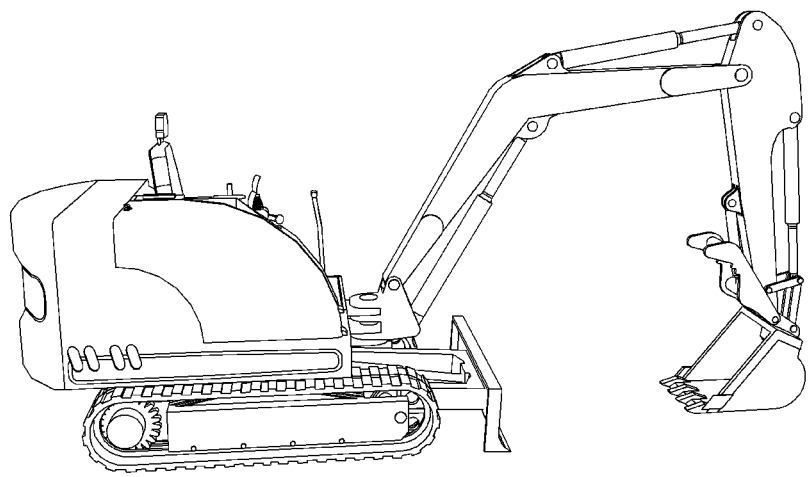
Figure 4G:
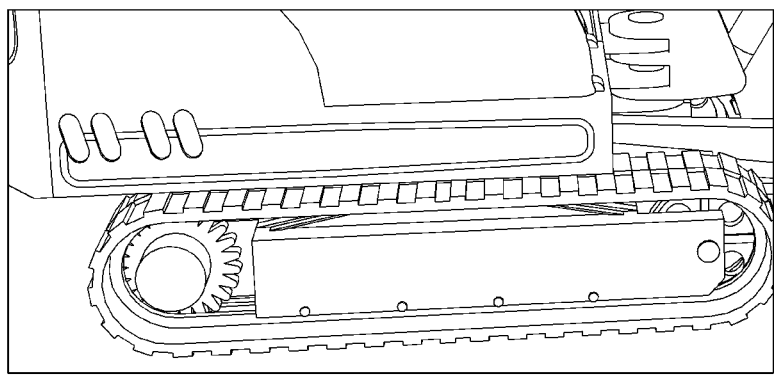
Figure 4H:
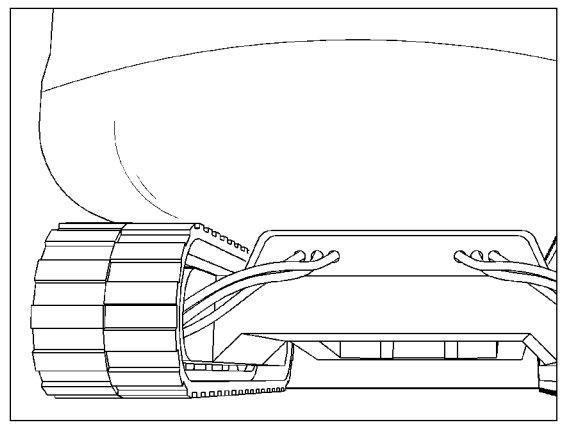
Figure 4I:
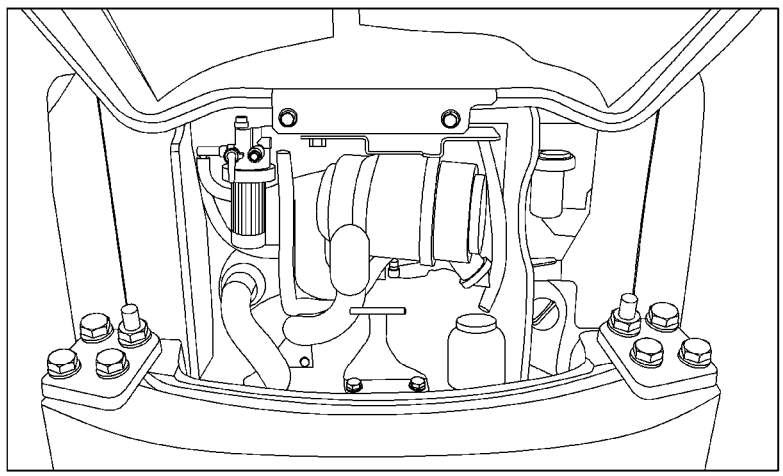
Figure 4J:
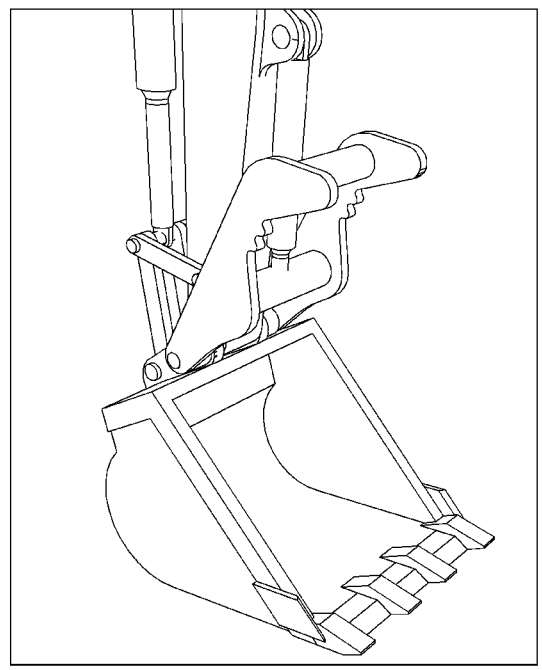
Figure 4K:
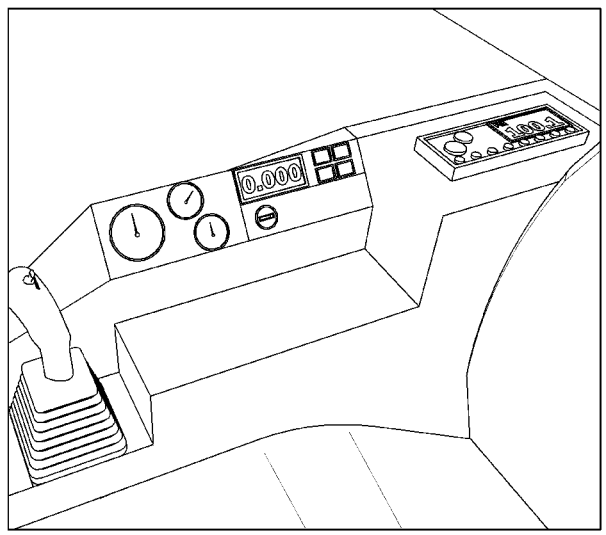

FIGS. 4a and 4b illustrate examples of nameplate images of an excavator, FIGS. 4c to 4f illustrate examples of front/rear/left/right images of an excavator, FIGS. 4g to 4j illustrate examples of partial images (e.g., including a part image) of an excavator, and FIG. 4k illustrates an example of an instrument panel image of an excavator.

The nameplate of the heavy equipment (e.g., an excavator) illustrated in FIGS. 4a and 4b may include information such as a model name, a machine number, an engine number, a product identification number, and a manufacturer of heavy equipment. The sale terminal device 150 may input heavy equipment information and sales subsidiary information. For example, the heavy equipment information may be information included in the nameplate image, and the sales subsidiary information may include a desired sale price and/or location information of the heavy equipment.

In step 315, the sale terminal device 150 may transmit heavy equipment sales request information including heavy equipment information, a heavy equipment image, and sales subsidiary information to the intermediary device 100. When the nameplate image of the heavy equipment is photographed, an input of the heavy equipment information may be omitted. In this case, the sale terminal device 150 may generate heavy equipment sales request information including the heavy equipment image and the sales subsidiary information and transmit the generated heavy equipment sales request information to the intermediary device 100.

The heavy equipment sales request information may include heavy equipment information, a heavy equipment image, and/or sales subsidiary information. The heavy equipment information of the heavy equipment sales request information may include some or all of a model name, a heavy equipment name, a heavy equipment production year, a capacity (size), and/or a production year of the heavy equipment to be sold. The heavy equipment image of the heavy equipment sales request information may include at least one still image and/or moving image file photographed based on a photographing method provided by the intermediary device 100. For example, the still image may include a nameplate image. As another example, the still image may include still images illustrated in FIGS. 4a to 4k. The sales subsidiary information of the heavy equipment sales request information may include a desired sale price of the heavy equipment and include area information in which the heavy equipment is located.

When the heavy equipment sales request information is received, the intermediary device 100 may analyze the heavy equipment sales request information in step 317, and generate heavy equipment sales information based on an analysis result in step 319. Specifically, when a nameplate image is included in the heavy equipment image, the intermediary device 100 may recognize the nameplate image to extract heavy equipment information in step 317. The heavy equipment information extracted from the nameplate image may include a heavy equipment serial number, a vehicle identification number, and the like. For example, when the nameplate image illustrated in FIG. 4a is recognized, the intermediary device 100 may extract information such as a heavy equipment model number, a machine number, an engine number, a production identification number, and a manufacturer from the nameplate image. Further, the sale terminal device 150 may input the heavy equipment information to a screen provided by the intermediary device 100. In this case, when the sale terminal device 150 transmits the nameplate image, the sale terminal device 150 may omit an input of the heavy equipment information. Further, the sale terminal device 150 may add heavy equipment information to the displayed screen and input the information. For example, the sale terminal device 150 may further input information such as a production year, and an operating time of the heavy equipment.

The intermediary device 100 may generate heavy equipment sales information based on the heavy equipment information, the heavy equipment image, and the sales subsidiary information, and in step 321, the intermediary device 100 may register the generated sales information of the heavy equipment in the database.

In step 351, in order to purchase heavy equipment, the purchase terminal device 160 may access to the intermediary device 100. When the purchase terminal device 160 is accessed, the intermediary device 100 may transmit a sale list of heavy equipment registered in the database to the purchase terminal device 160 in step 353. The displayed heavy equipment sale list may be displayed on an initial screen provided by the intermediary device 100, and the displayed information may be all or some of a thumbnail image of registered heavy equipment, a heavy equipment manufacturer model name, a heavy equipment type, a production year, a use time, a location, a sale price, and the like.

In step 355, the purchase terminal device 160 may select desired heavy equipment (or a heavy equipment type) on the displayed screen, and when the heavy equipment is selected, the purchase terminal device 160 may transmit optional information to the intermediary device 100. When selection of the heavy equipment is recognized, the intermediary device 100 may transmit detailed sales information of the selected heavy equipment to the purchase terminal device 160 in step 357. Here, the heavy equipment detailed sales information may be heavy equipment sales information generated based on the heavy equipment sales request information of the sale terminal device 150. The heavy equipment sales information may include heavy equipment information, a heavy equipment image, and sales subsidiary information. The purchase terminal device 160 may determine the displayed heavy equipment sales information and purchase the heavy equipment or select another heavy equipment.

When the purchase terminal device 160 purchases heavy equipment, the purchase terminal device 160 may transmit purchase request information to the intermediary device 100 in step 359. In this case, the purchase request information may include information about a method of paying an amount for purchase of the heavy equipment and a delivery place. Further, the purchase request information may include price discount request information. For example, when the purchase request information received from the purchase terminal device 160 to the intermediary device 100 includes price discount request information, the intermediary device 100 may transmit the price discount request information to the sale terminal device 150. When the intermediary device 100 receives price discount response information representing price discount acceptance or price discount rejection of the price discount request information from the sale terminal device 150, the intermediary device 100 may transmit the price discount response information to the purchase terminal device 160. The price discount request and response may be performed before the purchase terminal device 160 transmits the purchase request information. For example, when the sale terminal device 150 accepts the price discount request of the purchase terminal device 160, the purchase terminal device 160 may transmit the purchase request information to the intermediate device 100. For example, when the sale terminal device 150 rejects a price discount request of the purchase terminal device 160, the purchase terminal device 160 may again request a price discount to a new price or may request purchase with an existing price.

When the purchase request information is received from the purchase terminal device 160, the intermediary device 100 may perform a sales and purchase contract processing of the heavy equipment based on the sales information and the purchase information in step 360. When the intermediary device 100 performs the sale and purchase contract processing of the heavy equipment, acceptance or rejection of the sale terminal device 150 to the price discount request of the purchase terminal device 160 may be considered. In step 361, the intermediary device 100 may notify the sale terminal device 150 of a sales result according to the purchase information based on a contract processing result, and in step 363, the intermediary device 100 may notify the purchase terminal device 160 of a purchase result according to the purchase request.

Figure 5:
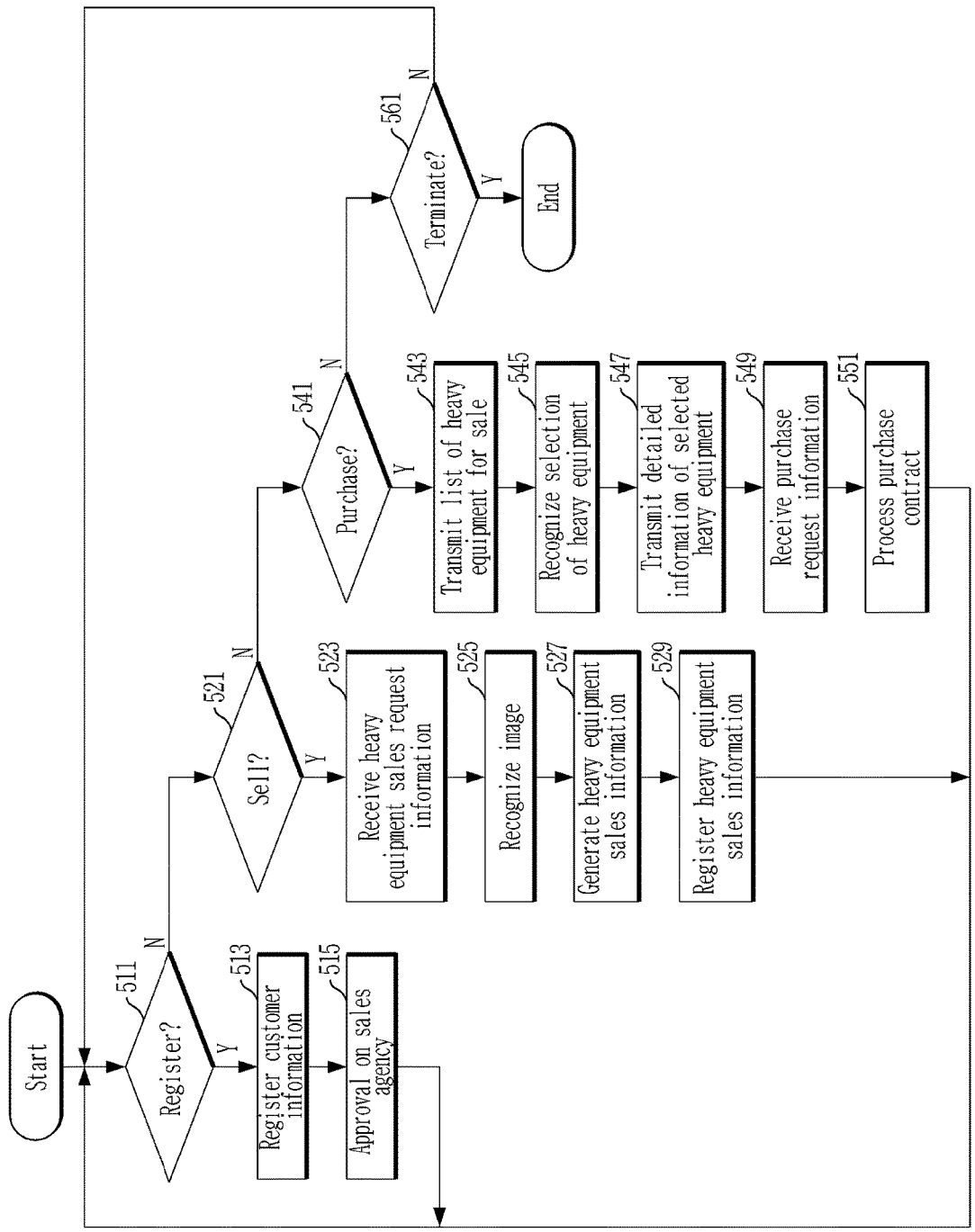
FIG. 5 is a flowchart illustrating an operation of an intermediary device according to an embodiment of the present inventive concept.

FIG. 5 is a flowchart illustrating an operation of an intermediary device according to an embodiment of the present inventive concept.

In step 511, the intermediary device (e.g., the intermediary device 100 of FIG. 1) may perform a registration operation of the sale terminal device (e.g., the sale terminal device 150 of FIG. 1) and the purchase terminal device (e.g., the purchase terminal device 160 of FIG. 1). In step 513, the intermediary device 100 may register input customer information and give a customer rating based on the input customer information. In step 515, the intermediary device 100 may receive agreement for sales agency of heavy equipment from the sale terminal device 150.

When a sales request is input by the sale terminal device 150, the intermediary device 100 may recognize the sales request in step 521 and receive heavy equipment sales request information from the sale terminal device 150 in step 523. When the heavy equipment sales request information is received, the intermediary device 100 may recognize a nameplate image in a heavy equipment image of the heavy equipment sales request information to extract heavy equipment information in step 525. Thereafter, in step 527, the intermediary device 100 may generate heavy equipment sales information based on the heavy equipment information, the heavy equipment image, and the sales subsidiary information, and in step 529, the intermediary device 100 may register the generated heavy equipment sales information at the database.

When access of the purchase terminal device 160 occurs, the intermediary device 100 may recognize the access in step 541 and transmit initial screen information including a list of the heavy equipment for sale to the purchase terminal device 160 in step 543. In this case, when specific heavy equipment is selected by the purchase terminal device 160, the intermediary device 100 may recognize selection of the heavy equipment in step 545, and in step 547, the intermediary device 100 may transmit sales detailed information of the selected heavy equipment. Here, the detailed sales information of the heavy equipment may be heavy equipment sales information generated in step 527. The purchase terminal device 160 may search for sales information of the selected heavy equipment while selecting heavy equipment and perform a purchase request for desired heavy equipment. When the purchase request is input by the purchase terminal device 160, the intermediary device 100 may receive purchase request information in step 549, and in step 551, the intermediary device 100 may perform a purchase contract processing of the corresponding heavy equipment based on the purchase request information. In this case, the intermediary device 100 may transmit purchase information to the sale terminal device 150 to perform an intermediary processing operation.

The intermediary device 100 may perform the above-described registration, sale, or purchase operation based on access of the terminal device. In this case, the registration operation may be performed when access of a terminal device that is not registered as a customer is recognized. Further, the sales and purchase operations may be performed by a registration type of a terminal device registered as a customer and/or a selection of the terminal device. For example, when a customer is registered, the customer may be registered as a sales customer or a purchase customer or as a customer who may perform both sales and purchase.

When access of the terminal device is recognized, the intermediary device may perform a registration, sale, or purchase operation by user selection of the terminal device. For example, when access of the terminal device is recognized, the intermediary device 100 may display a customer registration or login screen. In this case, when the customer logs in, the intermediary device 100 may analyze a type (e.g., sales customer or purchaser customer) of a login customer to handle execution of the sales or purchase operation. Further, when the customer logs in, the intermediary device 100 may display a purchase/sale item and process a purchase or sale operation according to the user's selection.

When the user of the intermediary device 100 requests termination, the intermediary device 100 may recognize the termination request and terminate an operation thereof in step 561.

Figure 6:
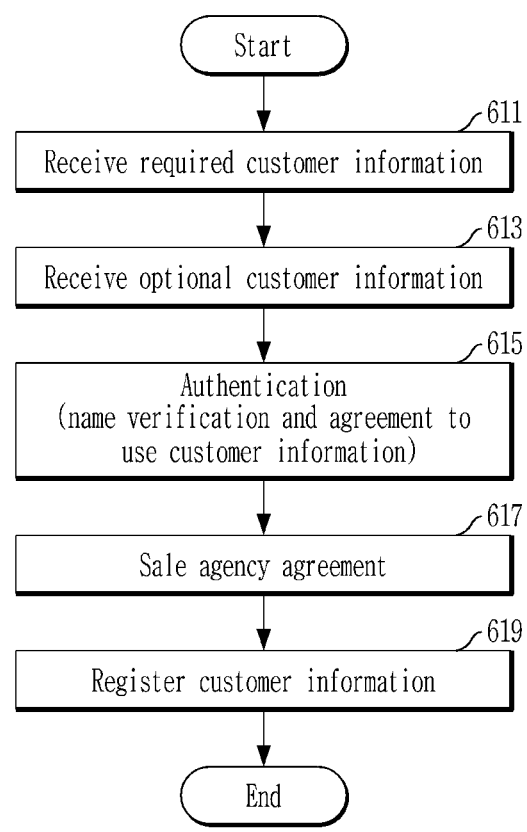
FIG. 6 is a flowchart illustrating a method of registering a customer in an intermediary device according to an embodiment of the present inventive concept.

FIG. 6 is a flowchart illustrating a method of registering a customer of an intermediary device according to an embodiment of the present inventive concept.

Referring to FIG. 6, the intermediary device 100 (e.g., the intermediary device 100 of FIG. 1) may give a rating according to customer information input by a terminal device (e.g., the sale terminal device 150 or the purchase terminal device 160 of FIG. 1).

In step 611, the intermediary device 100 may receive required customer information and receive optional customer information in step 613. The required customer information may include a customer's name (e.g., English/Korean), phone number (e.g., cell phone/office phone), and whether owner or not of heavy equipment. The optional customer information may include a resident registration number or a business registration number, an address for registering heavy equipment location information, and actual owner information of heavy equipment.

Thereafter, in step 615, the intermediary device 100 may perform an authentication procedure of the input customer information. An authentication method may include procedures such as real name verification and agreement for use of customer information. After the authentication procedure is performed, the intermediary device 100 may perform a purchase agreement (agreement for sale agency) procedure in step 617 and set a customer rating according to input information fidelity and register the customer rating as customer information in step 619.

The intermediary device 100 may assign a customer rating according to information input from the terminal device. For example, the customer rating may include a family rating and a dealership rating. In this case, the family rating may be given to a customer who inputs only required information, and the dealership rating may be given to a customer who provides a resident registration number/business registration number, location information of heavy equipment, and heavy equipment owner information in addition to required information. The intermediary device 100 may provide differential information according to a customer rating. A method of differentiating a providing service according to the customer rating may prevent from falsely uploading heavy equipment for sale or any one from reading information. For example, when the user registers only a name and uses an application, the user may quickly register heavy equipment for sale, but a purchaser may receive undetailed sales information and thus reliability of a heavy equipment sale agency procedure may be lowered. Therefore, because a customer rating is given based on provided sales information, the sales information may be provided in more detail and thus more reliable information may be provided. Further, the intermediary device 100 may give a differential customer rating based on information fidelity and a detailed rating may be further divided even within the same customer rating.

Figure 7:
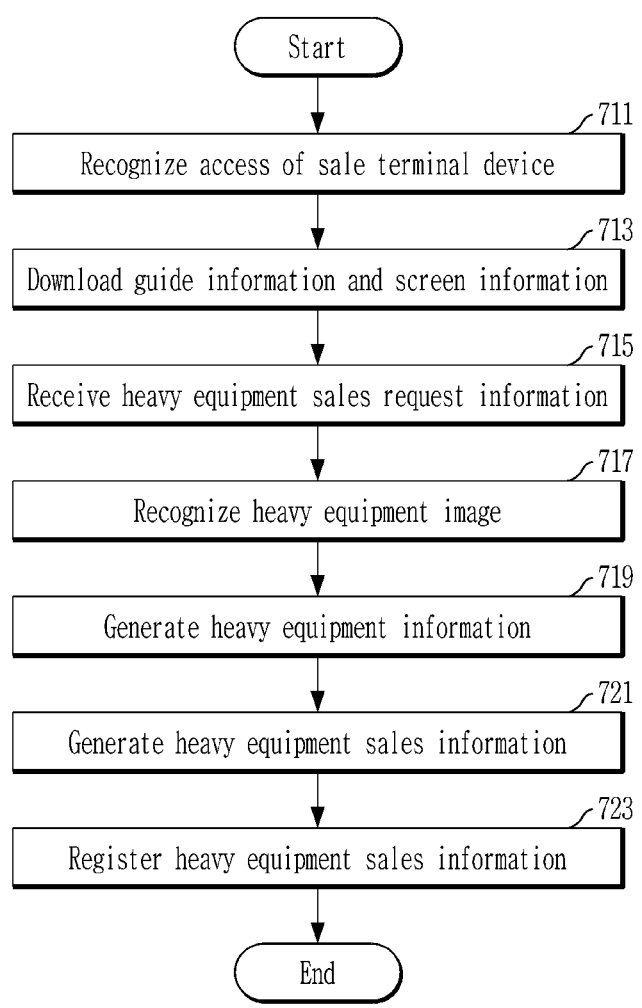
FIG. 7 is a flowchart illustrating a sales information registration procedure in an intermediary device according to an embodiment of the present inventive concept.

FIG. 7 is a flowchart illustrating a sales information registration procedure of an intermediary device according to an embodiment of the present inventive concept.

When the intermediary device 100 (e.g., the intermediary device 100 of FIG. 1) recognizes access of the sale terminal device (e.g., the sale terminal device 150 of FIG. 1) in step 711, the intermediary device 100 may transmit screen information and information for guiding an input of information for sale of heavy equipment to the accessed sale terminal device 150 in step 713. When the terminal device is accessed to the intermediary device 100, the intermediary device 100 may display an item for requesting selection of sale or purchase on a screen, and when the terminal device selects sale, the intermediary device 100 may recognize the accessed terminal device as the sale terminal device 150. Alternatively, when the terminal device is accessed to the intermediary device 100, the intermediary device 100 may analyze customer information of the accessed terminal device, and when the accessed terminal device is registered as the sale terminal device 150 as an analysis result, the intermediary device 100 may recognize the accessed terminal device as a sale terminal device.

When the accessed terminal device is recognized as the sale terminal device 150, the intermediary device 100 may display a guidance message and a screen for inputting sales request information of the heavy equipment in the accessed terminal device. The guidance message may be guide information of a method of uploading information of heavy equipment for sale. For example, the guidance message may include an animation movie clip. As another example, the guidance message may include a message for guiding a photographing position, a photographing angle, and the like of a heavy equipment image including a nameplate image of the heavy equipment. The heavy equipment image may include a plurality of still images and moving images. Further, the intermediary device 100 may download screen information for inputting heavy equipment information and/or sales subsidiary information to the sale terminal device 150. When the nameplate image is transmitted, a user of the sale terminal device 150 may omit an input of the heavy equipment information. Further, when the heavy equipment information is input, the user of the sale terminal device 150 may input only a model name of the heavy equipment. The sales subsidiary information may include required information and optional information. The required information of the sales subsidiary information may include a desired sale price. The optional information of the sales subsidiary information may include a period in which the heavy equipment may be sold by the intermediary device 100, a delivery place, whether sales agency or not, domestic sale or overseas sale, and the like. The heavy equipment information of the heavy equipment sales request information may include common information (e.g., model name, heavy equipment name, heavy equipment manufacturer, heavy equipment capacity) of the heavy equipment, and the sales subsidiary information of the heavy equipment sales request information may include individual information (e.g., desired sale price, sale duration, delivery place) for sale of heavy equipment.

The sale terminal device 150 may generate heavy equipment sales request information including heavy equipment information, a heavy equipment image, and sales subsidiary information and transmit the generated heavy equipment sales request information to the intermediary device 100. For example, when a heavy equipment image including a nameplate image is transmitted, the sale terminal device 150 may include a nameplate image at a location designated by the intermediary device 100 to generate heavy equipment sales request information. This is because when the intermediary device 100 recognizes the nameplate image, the intermediary device 100 enables to determine an image included in a predetermined position as the nameplate image and to recognize the image.

When the sale terminal device 150 transmits the heavy equipment sales request information, the intermediary device 100 may receive the heavy equipment sales request information in step 715 and generate heavy equipment information in steps 717 and 719. When the heavy equipment sales request information is received, the intermediary device 100 may determine whether a heavy equipment image is included, and if the heavy equipment image is included, the intermediary device 100 may determine whether a nameplate image is included. If the nameplate image is included, the intermediary device 100 may recognize the nameplate image in step 717, and the intermediary device 100 may generate heavy equipment information based on a recognized result in step 719. If the nameplate image is not included (e.g., when a nameplate image is not included in the heavy equipment image of the heavy equipment sales request information or when a heavy equipment image is not included in the heavy equipment sales request information), the intermediary device 100 may omit an operation of step 717, and in step 719, the intermediary device 100 may generate heavy equipment information using heavy equipment information included in the heavy equipment sales request information. When the heavy equipment information includes only a model name of the heavy equipment, the intermediary device 100 may generate heavy equipment information further including a full name of heavy equipment corresponding to the model name, a manufacturer, and a heavy equipment capacity (e.g., tonnage).

After heavy equipment information is generated, the intermediary device 100 may generate heavy equipment sales information in step 721, and the intermediary device 100 may add and register the generated heavy equipment sales information to a categorized heavy equipment item in step 723. The intermediary device 100 may categorize sales information of the heavy equipment to be sold and store the categorized sales information in the database. Here, the database may be the first database included in the memory 240 of FIG. 2.

The intermediary device 100 may register the generated heavy equipment sales information on a heavy equipment category basis or on a heavy equipment name basis. For example, the heavy machinery category may be classified into construction equipment, transportation equipment, agricultural equipment, fishery equipment, and landscape equipment. Here, the construction equipment may include an excavator, a loader, a roller, a crane, a dump truck, a dozer, and drilling equipment, the transportation equipment may include a truck, a trailer, and a large vehicle, the agricultural equipment may include a tractor, a haymaker, livestock equipment, and tillage equipment. Alternatively, the intermediary device 100 may perform categorization on a heavy equipment name (e.g., excavator, dump truck) basis. For example, the excavator may be divided into various forms according to a wheel (e.g., tire, caterpillar), an equipment width, an excavation depth, an excavation height, an equipment weight, and an equipment tower height. When a model name of the excavator is determined, the intermediary device 100 may extract corresponding information of the excavator based on the model name, perform categorization of 'the excavator of the construction equipment' or 'the excavator' based on an extracted result, and register heavy equipment sales information at a categorized position.

The intermediary device 100 may be connected to a plurality of sale terminal devices 150 and purchase terminal devices 160 through the Internet network 170 and may be connected to other intermediary devices 110. When a purchase request is received from the purchase terminal device 160, the intermediary device 100 may provide sales information of heavy equipment registered in the database and store information requested to purchase by the purchase terminal device 160 in the database or may be accessed to another intermediary device 110 to provide sales information of heavy equipment that may be sold.

Figure 8:
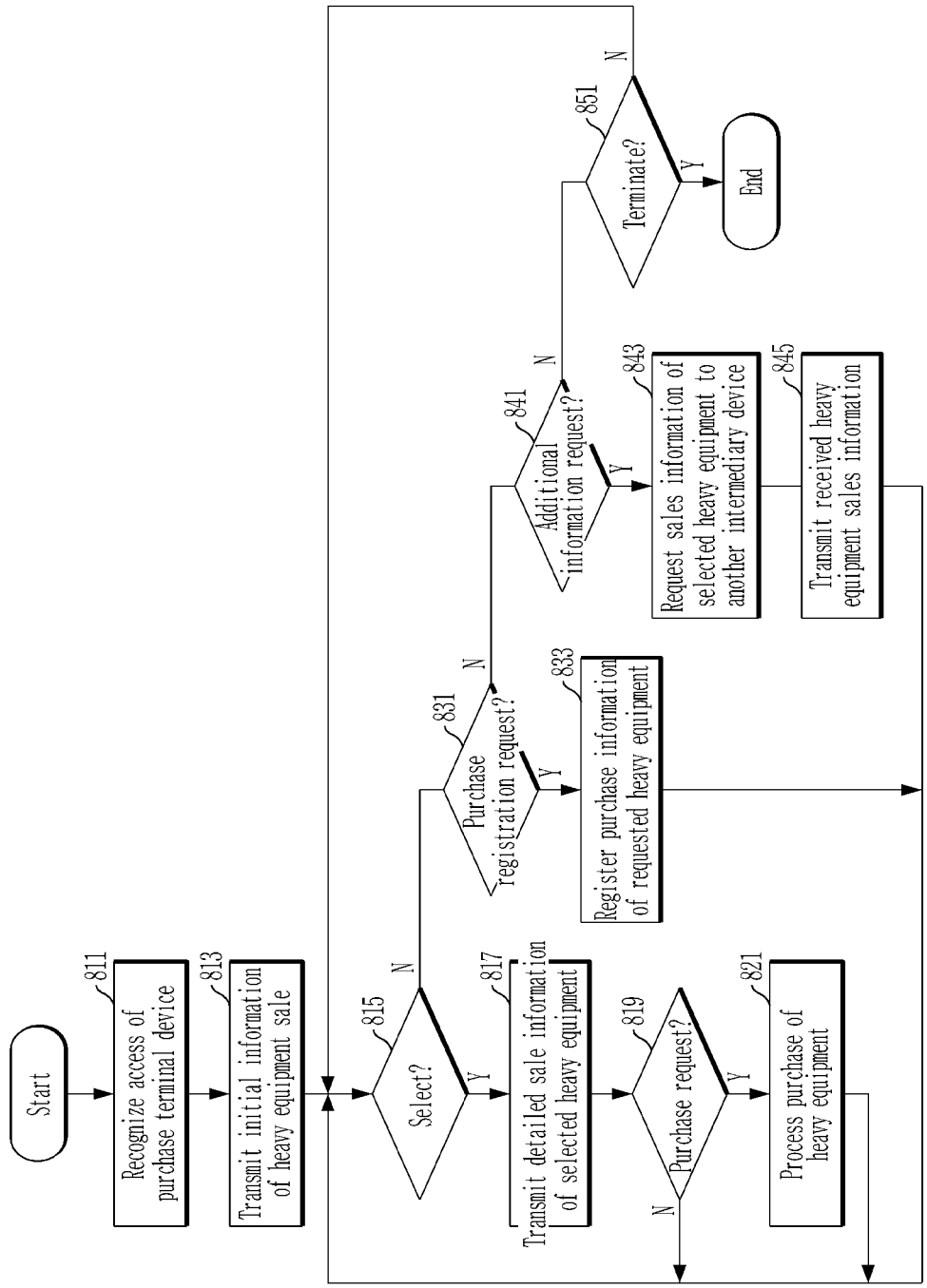
FIG. 8 is a flowchart illustrating an operation in which an intermediary device mediates heavy equipment purchase according to an embodiment of the present inventive concept.
Figure 9A:
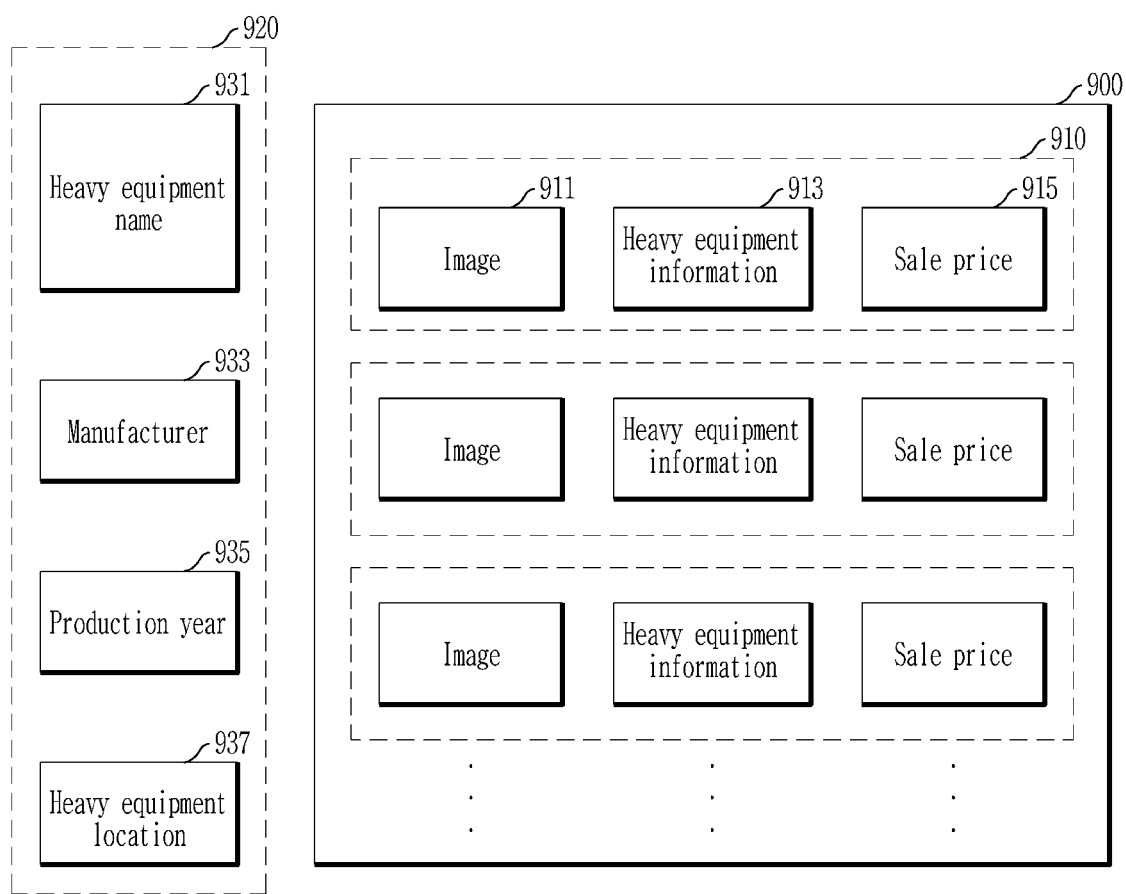
FIGS. 9a and 9b are diagrams illustrating screens of heavy equipment sales information provided by the intermediary device.
Figure 9B:
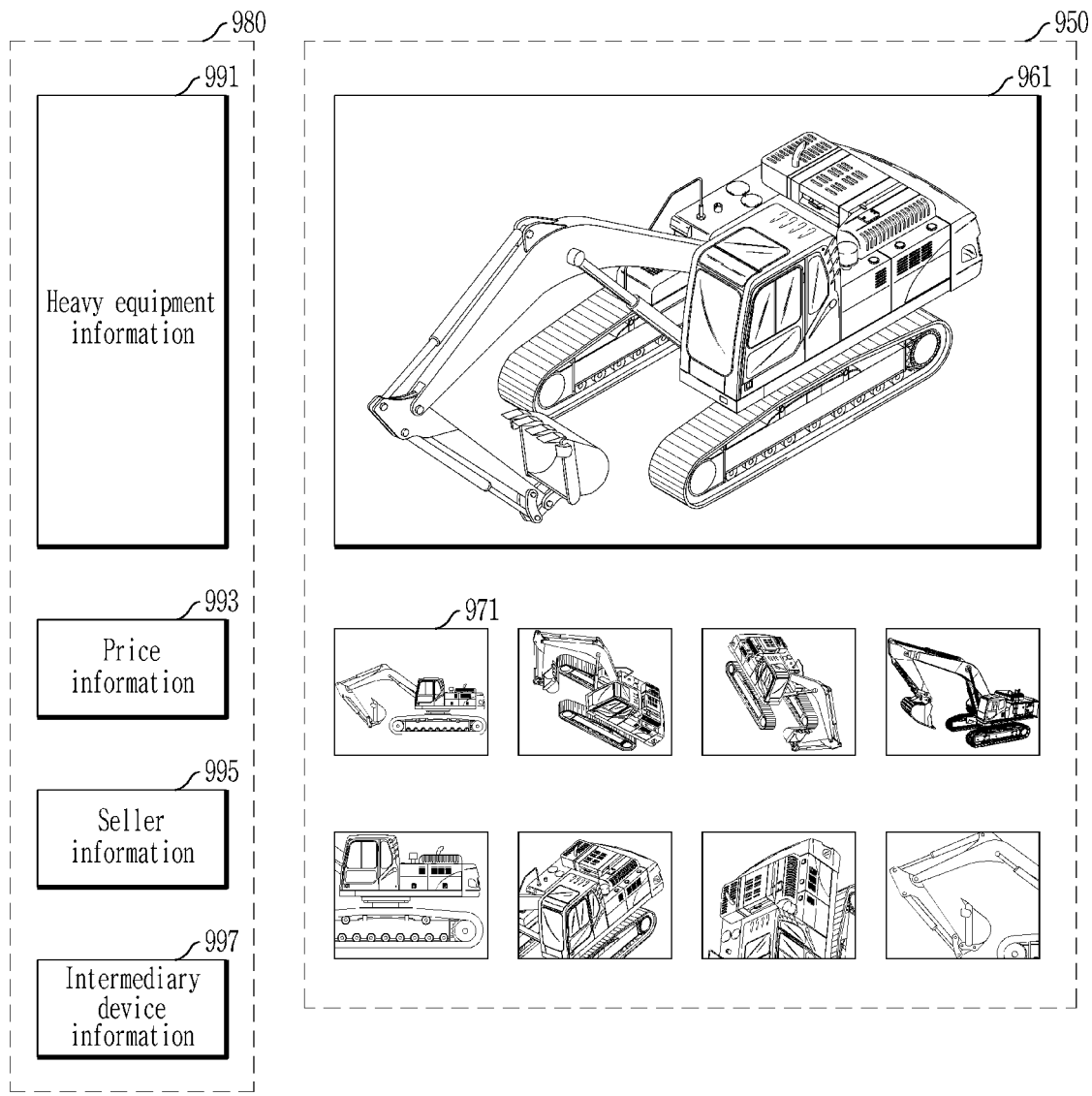

FIG. 8 is a flowchart illustrating an operation in which an intermediary device mediates heavy equipment purchase according to an embodiment of the present inventive concept. FIGS. 9a and 9b are diagrams illustrating screens of heavy equipment sales information provided by the intermediary device.

When the intermediary device 100 (e.g., the intermediary device 100 of FIG. 1) recognizes access of the purchase terminal device (e.g., the purchase terminal device 160 of FIG. 1) in step 811, the intermediary device 100 may transmit initial screen information for purchasing heavy equipment to the accessed purchased purchase terminal device 160 in step 813. When the terminal device is accessed to the intermediary device 100, the intermediary device 100 may display an item that requests selection of sales or purchase on a screen, and when purchase is selected by the terminal device, the intermediary device 100 may recognize the accessed terminal device as the purchase terminal device 160. Further, when the terminal device is accessed to the intermediary device 100, the intermediary device 100 may analyze customer information of the accessed terminal device, and when the accessed terminal device is registered as the purchase terminal device 160, the intermediary device 100 may recognize the accessed terminal device as the purchase terminal device 160.

When the accessed terminal device is recognized as the purchase terminal device 160, the intermediary device 100 may download initial screen information that may select heavy equipment to be sold to the accessed terminal device in step 813. An initial screen provided by the intermediary device 100 may have a structure illustrated in FIG. 9a. As illustrated in FIG. 9a, the screen may include a sales information area 900 and a search area 920 of the heavy equipment. The sales information area 900 may include a plurality of heavy equipment sales information 910 that displays sales summary information of the heavy equipment, and each heavy equipment sales information area 910 may include information such as an image 911 of the heavy equipment, heavy equipment information 913, and a sale price 915. The image 911 may be a thumbnail image of heavy equipment for sale, and the heavy equipment information 913 may include a name, a manufacturer, a production year, and a current position of heavy equipment for sale, and the sale price 915 may be a desired sale price of the seller. The sale price may include a brokerage fee of the intermediary device 100.

Purchase search of the heavy equipment may be performed through a search word input area (not shown). Further, desired heavy equipment may be searched through the search area 920 of FIG. 9a that may search for heavy equipment for sale with a menu method. The search area 920 may be an area in which a user may search for heavy equipment wanting to purchase. A search method based on the search area 920 may include a method of searching using a heavy equipment name area 931, a manufacturer area 933, a production year area 935, and/or a heavy equipment location area 937.

The heavy equipment name 931 may be configured by categorizing heavy equipment for sale into a preset form. For example, the heavy equipment name 931 may be grouped (e.g., first grouping) into groups such as construction heavy equipment, transportation heavy equipment, and other heavy equipment. The construction heavy equipment may be grouped (e.g., second grouping) into groups such as a bulldozer, an excavator, a loader, a fork lift truck, a motor scraper, a dump truck, a crane, and other construction heavy equipment, the transportation heavy equipment may be grouped (e.g., second grouping) into groups such as a truck, bus, lorry, tractor unit, trailer, ladder truck, and other transportation heavy equipment, and other heavy equipment may be again grouped into agricultural heavy equipment, forestry heavy equipment, and the like. Further, the second grouped heavy equipment may be again grouped into small groups based on a size (or capacity). As another example, the heavy equipment name 931 may be set based on specific heavy equipment. A transaction of used heavy equipment may be concentrated on specific heavy equipment. In the case of construction heavy equipment, the demand for excavators and dump trucks may be high. Accordingly, a method of arranging heavy equipment items having a large amount of demand, such as an excavator, a dump truck, and the like in the heavy equipment name area 931 may be applied.

The manufacturer area 933 may be an area for searching for a company that produces heavy equipment, the production year area 935 may be an area for searching for a production year of heavy equipment, and the heavy equipment location area 937 may be an area for searching for a city in which heavy equipment to be currently sold is located.

The intermediary device 100 may provide the initial screen illustrated in FIG. 9a to the purchase terminal device 160 in step 813, and a user (purchaser) of the purchase terminal device 160 may search for desired heavy equipment through the search area 920 on a displayed screen. That is, when the user (purchaser) selects desired heavy equipment through the heavy equipment name area 931, the purchase terminal device 160 may display sales information (sales information corresponding to the selected heavy equipment name) provided by the intermediary device 100 through the sales information area 900. For example, when an excavator is selected, an image of the registered excavator may be displayed in the image area 911 of each heavy equipment sales information area 910 included in the sales information area 900, and in the heavy equipment information area 913 and the sales price area 915, heavy equipment information and the sale price linked to the image displayed in the image area 911 may be displayed.

When the manufacturer area 933 is selected, the intermediary device 100 may search for heavy equipment sales information of the selected manufacturer and provide the heavy equipment sales information to the purchase terminal device 160. When the production year area 935 is selected, the intermediary device 100 may search for heavy equipment sales information produced in the selected year and provide the heavy equipment sales information to the purchase terminal device 160. When the heavy equipment location area 937 is selected, the intermediary device 100 may search for heavy equipment sales information located at the selected city and provide the heavy equipment sales information to the purchase terminal device 160.

The user (purchaser) may search for a desired type of heavy equipment sales information through the search area 920, and the heavy equipment sales information based on the found item may be displayed in the sales information area 900. For example, when the user (purchaser) selects 'excavator', '2012-2015', and 'Seoul' through the heavy equipment name area 931, the production year area 935, and the heavy equipment location area 937, the intermediary device 100 may search for heavy equipment sales information registered in the database and transmit information about an excavator produced between 2012 and 2015 and in which a purchase position is Seoul to the purchase terminal device 160. The purchase terminal device 160 may display excavator sales information transmitted by the intermediary device 100 in the sales information area 900 illustrated in FIG. 9a. The user (purchaser) may select desired heavy equipment using the items 931, 933, 935, and 937 included in the search area 920.

When the user (purchaser) of the purchase terminal device 160 inputs a search word or selects desired heavy equipment through a search area, the intermediary device 100 may recognize a selection of the purchase terminal device 160 in step 815, and in step 817, the intermediary device 100 may obtain detailed sales information of the selected heavy equipment from the database and transmit the detailed sales information to the purchase terminal device 160. Therefore, as illustrated in FIG. 9b, the purchase terminal device 160 may display sales information of the heavy equipment (selected heavy equipment) downloaded from the intermediate equipment 100. The heavy equipment sales information may include heavy equipment information, a heavy equipment image, and sales subsidiary information. A screen for displaying sales information of the selected heavy equipment may include an image area 950 and an information area 980. The image area 950 may include a main image display area 961 of the selected heavy equipment and a thumbnail image display area 971. The heavy equipment image may include a still image and/or a moving image. When the user selects a thumbnail image displayed in the thumbnail image area 971, the selected image may be enlarged and displayed in the main image area 961.

In a heavy equipment information area 991, heavy equipment information such as a heavy equipment name, a model name, a production year, a heavy equipment location, and a heavy equipment use time may be displayed. The heavy equipment names may be displayed to correspond to categorized groups. For example, when a type of an excavator is classified into large, medium, and small, an excavator name may be displayed as a large excavator, a medium excavator, or a small excavator. The heavy equipment location is an area in which heavy equipment to be currently sold is located and may be displayed in various forms. For example, the heavy equipment location may be displayed in the form such as Seoul, Seoul/Korea, and Seoul/Korea/Asia. Further, in the heavy equipment information area 991, identification information (e.g., CETEC ID) given by the intermediary device 100 may be further displayed.

In a price information area 993, the seller's desired sale price may be displayed. Further, the desired sale price may include a brokerage fee of the intermediary device 100. The brokerage fee may be paid by the purchaser and/or the seller.

In a seller information area 995, owner information of the heavy equipment may be displayed. In the seller information area 995, individual or company information may be displayed. The seller information displayed in the seller information area 995 may include a seller name (e.g., company or individual), a seller phone number (e.g., mobile, home, company), email, home URL address (in the case of a company), and the like.

A company name of the intermediary device 100 (name of a company providing a heavy equipment sale agency service, for example, CETEC), an intermediary device phone number, an e-mail address, a home page URL address, and the like may be displayed in an intermediary device information area 997.

In the state where the intermediary device 100 transmits the heavy equipment sales information (sales information of the selected heavy equipment) illustrated in FIG. 9b, a purchase request item, a purchase registration request item, and an additional information request item may be further displayed. The purchase request item may be an item that may request purchase of heavy equipment corresponding to the currently displayed heavy equipment sales information. When there is no heavy equipment satisfying a desired condition among heavy equipment registered for sale in the intermediary device 100 or when there is an opinion for negotiating purchase of specific heavy equipment, the purchase registration request item may be an item that may register a sales condition or an opinion of the heavy equipment in the intermediary device 100. When there is no heavy equipment satisfying a desired condition among heavy equipment registered for sale in the intermediary device 100, an additional information request item may be an item that may request heavy equipment sale information registered in another intermediary device (e.g., the intermediary device 110 of FIG. 1) linked to the intermediary device 100. Here, another intermediary device 110 may be an intermediary device of a company that may be linked to the intermediary device 100 as an intermediary device of a partner company located inside/outside the country and that may mediate used heavy equipment.

In a state of providing sales information of heavy equipment, when a purchase request is received from the purchase terminal device 160, the intermediary device 100 may recognize the purchase request in step 819 and perform a transaction procedure of the selected heavy equipment in step 821. In this case, when requesting purchase, the purchase terminal device 160 may transmit purchase request information including a method of paying for heavy equipment (e.g., a method of paying for lump sum payment, down payment, and middle payment) and a method of delivering heavy equipment (e.g., heavy equipment delivery place). Thereafter, in step 821, the intermediary device 100 may transmit heavy equipment purchase information including a method of paying for an amount and a delivery method of the purchase terminal device 160 to the sale terminal device 150 that sells the selected heavy equipment. Further, the intermediary device 100 may transmit a result according to a transaction message transmitted from the sale terminal device 150 to the purchase terminal device 160 to execute a transaction operation of the heavy equipment.

Further, when a purchase registration request signal is received from the purchase terminal device 160, the intermediary device 100 may recognize the purchase registration request signal in step 831, and the intermediary device 100 may register purchase information transmitted from the purchase terminal device 160 in a database (e.g., a second database) in step 833. When sales information registration of the heavy equipment is requested from the sale terminal device 150 (or when the heavy equipment sale request information is received), the intermediary device 100 may perform comparative analysis with the purchase registration information (or purchase information) registered in the database. When heavy equipment sales information corresponding to the purchase registration information is received (exists), the intermediary device 100 may transmit the purchase registration information to the sale terminal device 150 to perform a heavy equipment transaction procedure.

Further, when an additional information request signal is received from the purchase terminal device 160, the intermediary device 100 may recognize the additional information request signal in step 841, and the intermediary device 100 may request sales information of the heavy equipment to the linked another intermediary device 110 in step 843. In step 845, the intermediary device 100 may download the heavy equipment sales information received from another intermediary device 110, store the received heavy equipment sales information in a database (e.g., a third database), and transmit the heavy equipment sales information to the purchase terminal device 160. In this case, the heavy equipment sales information transmitted from the another intermediary device 110 may have a structure different from that of the heavy equipment sales information of the intermediary device 100. The intermediary device 100 may map and display each information item included in the heavy equipment sales information received from the another intermediary device 110 to a display structure (display form) illustrated in FIG. 9a and may similarly map and display each information item included in detailed sales information of the selected heavy equipment to the display structure (display form) illustrated in FIG. 9b.

As described above, by interworking with the purchase terminal device 160, the intermediary device 100 may provide the registered heavy equipment sales information to the purchase terminal device 160. Further, when purchase is requested from the purchase terminal device 160, the intermediary device 100 may perform a transaction procedure of the selected heavy equipment, and when additional information is requested from the purchase terminal device 160, the intermediary device 100 may request sales information of the heavy equipment to the linked another intermediary device 110 and provide the sales information to the purchase terminal device 160, and when registration of purchase information is requested from the purchase terminal device 160, the intermediary device 100 may register the purchase information transmitted by the purchase terminal device 160 in the database. When a termination signal occurs, the intermediary device 100 may terminate a heavy equipment purchase mediation operation in step 851.

As described above, the used heavy equipment intermediary system 1000 may provide heavy equipment sales information in real time and process purchasing information through online electronic commerce. Further, the used heavy equipment intermediary system 1000 may perform a heavy equipment leasing function in addition to sales and transaction of heavy equipment. For example, the used heavy equipment intermediary system 1000 may connect a heavy equipment owner and a construction company and thus the heavy equipment owner can improve a utilization rate of heavy equipment, and the construction company may select and rent appropriate heavy equipment. In such a case, the heavy equipment seller may be an owner, and the heavy equipment purchaser may be a tenant.

In order to photograph at least one of a nameplate image and a registration certificate image related to heavy equipment, and an appearance image, the intermediary device 100 may provide a translucent photographing guideline including a guide on photographing portions and photographing angles on a heavy equipment portion basis to the sale terminal device 150. In order to accurately provide heavy equipment characteristics to a purchaser and to determine a current state of the heavy equipment, it is necessary to photograph images (e.g., FIGS. 4a to 4k) about necessary portions (e.g., front, rear, left, and right, upper consumables, rear shape, and engine of the heavy equipment). Further, the heavy equipment nameplate may have different mounting positions according to a type of heavy equipment. Accordingly, the intermediary device 100 may provide a translucent photographing guideline including a guide on photographing portions and photographing angles for photographing a heavy equipment image on a heavy equipment portion basis so that necessary portions may be photographed to determine a current state of the heavy equipment.

The sale terminal device 150 may generate heavy equipment sales request information including at least one (e.g., FIGS. 4a and 4b) of a nameplate image and a registration certificate image, an appearance image (e.g. FIGS. 4c to 4k) of heavy equipment to be sold, heavy equipment information, heavy equipment location information, and a desired sale price.

When the intermediary device 100 receives heavy equipment sales request information from the sale terminal device 150, the intermediary device 100 may recognize at least one of the nameplate image and the registration certificate image included in the heavy equipment sales request information to extract heavy equipment information (second heavy equipment information) and compare the heavy equipment information (first heavy equipment information) included in the heavy equipment sales request information and the second heavy equipment information to authenticate the first heavy equipment information. The intermediary device 100 may perform heavy equipment information authentication for determining whether the heavy equipment sales request information is normal. Specifically, in order to determine whether the heavy equipment sales request information received from the sale terminal device 150 is normal, the intermediary device 100 may compare the heavy equipment information (first heavy equipment information) received from the sale terminal device 150 and the heavy equipment information (second heavy equipment information) extracted from the heavy equipment image to authenticate the first heavy equipment information. For example, in order to determine whether the heavy equipment sales request information input by the seller is normal, the intermediary device 100 may compare the heavy equipment information (first heavy equipment information) input by the seller and the heavy equipment information (second heavy equipment information) extracted from the heavy equipment image.

When authentication of the heavy equipment information is successful, the intermediary device 100 may add a commission and a tax to a desired sale price included in the heavy equipment sales request information to calculate an estimated sale price and generate and register heavy equipment sales information including at least one of the heavy equipment information, the nameplate image, the registration certificate image, the appearance image, the heavy equipment location information, and the estimated sale price.

The intermediary device 100 may adjust a seller rating based on sales information fidelity. The intermediary device 100 may adjust a seller rating given to the sale terminal device 150 according to an amount of information provided from the sale terminal device 150 for heavy equipment sale. Specifically, the intermediary device 100 may set a seller rating given to the sale terminal device 150 according to information provided from the sale terminal device 150 for heavy equipment sale. For example, a family rating may be given to a user who inputs only required information, and a dealership rating may be given to a user who provides a resident registration number, a business registration number, location information, vehicle owner information, and the like in addition to required information. As ratings are given to the sellers in a differential manner, it is possible to prevent the seller from falsely uploading heavy equipment for sale or to prevent any body from reading information. In the case of a seller who registers and uses only a name, registration of heavy equipment for sale may be performed quickly, but information of heavy equipment may include wrong contents (e.g., typing error). That is, when the seller provides more information on the heavy equipment, heavy equipment sales information with high reliability may be provided to the purchaser and thus the intermediary device 100 may adjust a seller rating based on seller information fidelity provided from the sale terminal device 150.

The intermediary device 100 may automatically recognize a terminal device. Specifically, the intermediary device 100 may analyze information (e.g., user information) of the terminal device accessed thereto and determine whether the accessed terminal device is the sale terminal device 150 or the purchase terminal device 160, and perform an operation for sale or an operation for purchase according to a determination result.

The used heavy equipment intermediary system 1000 may provide a screen including a search area and a sales information area. Specifically, when the terminal device accessed to the intermediary device 100 is a purchase terminal device, a screen (first screen) including a search area and a sales information area may be provided to the accessed terminal device. Here, the search area (e.g., 920 of FIG. 9a) of the first screen may include a heavy equipment name search area (e.g., 931 of FIG. 9a) that uses a method of arranging heavy equipment according to demand, a manufacturer search area (e.g., 933 of FIG. 9a) for searching for a heavy equipment manufacturer, a production year search area (e.g., 935 of FIG. 9a) for searching for a heavy equipment production year, and a heavy equipment location search area (e.g., 937 of FIG. 9) for searching for a region (city) in which heavy equipment is located. Specifically, because a transaction of used heavy equipment may be concentrated on specific heavy equipment, the heavy equipment name search area (e.g., 931 of FIG. 9a) may be set based on specific heavy equipment. For example, in the case of heavy construction equipment, because there may be a large demand for an excavator and a dump truck, in the heavy equipment name search area (e.g., 931 of FIG. 9a), a method of arranging heavy equipment having much demand such as an excavator and a dump truck may be applied. The sales information area (e.g., 900 of FIG. 9a) of the first screen may include a heavy equipment image area (e.g., 911 of FIG. 9a) that displays an image related to the heavy equipment found through the search area (e.g., 920 of FIG. A), a heavy equipment information area (e.g., 913 of FIG. 9a) in which heavy equipment information related to the found heavy equipment is displayed, and a sales price area (e.g., 915 of FIG. 9a) in which a sale price (e.g., a sale price with a commission and a tax are added to a desired selling amount) related to the found heavy equipment is displayed.

The used heavy equipment intermediary system 1000 may provide a screen for displaying heavy equipment sales information. Specifically, the intermediary device 100 may transmit heavy equipment sales information related to heavy equipment selected by the terminal device among heavy equipment found through the search area (e.g., 920 of FIG. 9a) to the terminal device, and the terminal device may display heavy equipment sales information related to the selected heavy equipment through the screen (second screen). The image area (e.g., 950 of FIG. 9b) of the second screen may include a first area (e.g., 971 of FIG. 9b) in which thumbnail images related to the selected heavy equipment are displayed and a second area (e.g., 961 of FIG. 9b) in which a selected thumbnail image among the thumbnail images is displayed in an enlarged manner. The information area (e.g., 980 of FIG. 9b) of the second screen may include a heavy equipment information area (e.g., 991 of FIG. 9b), a price information area (e.g., 993 of FIG. 9b), a seller information area (e.g., 995 of FIG. 9b), and an intermediary device information area (e.g., 997 of FIG. 9b).

The intermediary device 100 may map information on heavy equipment for sale of another intermediary device 110 to correspond to an information structure of the intermediary device 100. Specifically, when the purchase terminal device 160 selects heavy equipment additional information, the intermediary device 100 may search for heavy equipment for sale of another intermediary device 110 linked thereto, transmit and store a list of the same heavy equipment to the purchase terminal device 160 in order to display the list of the same heavy equipment to correspond to the first screen, and transmit detailed sales information of selected heavy equipment to the purchase terminal device 160 in order to display detailed sales information of heavy equipment selected by the purchase terminal device 160 among the heavy equipment displayed on the first screen through the second screen. The heavy equipment sales information received from the another intermediary device 110 linked to the intermediary device 100 may have a different structure from an information structure of the intermediary device 100. Accordingly, the intermediary device 100 may map and display each item of the heavy equipment sales information received from the another intermediary device 110 to correspond to the first screen (e.g., FIG. 9a) and map and display each item of detailed sales information of selected heavy equipment to correspond to the second screen (e.g., FIG. 9b).

Information provided by the another intermediary device 110 linked to the intermediary device 100 may be stored in the database and thus an amount of information stored in the intermediary device 100 may increase.

The used heavy equipment intermediary system 1000 may blur some areas of photographed images of the used heavy equipment. For example, after heavy equipment for sale is photographed according to the photographing guideline (photographing guide image), when some (e.g., a name plate of the heavy equipment, heavy equipment peripheral information, heavy equipment management company name displayed in heavy equipment, and phone number) of information included in the photographed image should be covered, the intermediary device 100 may blur the information through an image editing tool (e.g., brush, pen). However, correction or editing of image information should be prevented as much as possible for heavy equipment reliability.

The used heavy equipment intermediary system 1000 may provide a voice instruction function based on voice recognition on a processing step basis for heavy equipment registration for sale or heavy equipment search for purchase. For example, the intermediary device 100 may select at least one of a touch function and a voice recognition processing function during a processing operation for heavy equipment sale or purchase and enable each processing operation to proceed through the selected function. Thereby, when the user is in a situation in which both hands are not free on the field or in a situation in which a screen touch or a character input is difficult, the user may utilize a voice instruction function based on voice recognition.

The used heavy equipment intermediary system 1000 may provide an artificial intelligence (AI) search function. For example, before a desired sale price for registration of heavy equipment for sale is input, the intermediary device 100 may search for and refer to existing desired sale price information of heavy equipment similar to the heavy equipment through an AI search function to enable to set a desired sale price. For example, before information for purchasing heavy equipment is registered, the intermediary device 100 may search for and compare price information of heavy equipment for sale through the AI search function and enable the result to reflect to information registration for purchasing heavy equipment. The AI search function may also utilize multiple related sites for search.

Some or all of functions of the intermediary device 100, the sale terminal device 150, or the purchase terminal device 160 described in this specification may be performed through a used heavy equipment mediation program (or used heavy equipment mediation application).

Some of functions of the intermediary device 100 described in this specification may be performed by the sale terminal device 150 or the purchase terminal device 160. Some of functions of the sale terminal device 150 or the purchase terminal device 160 described in this specification may be performed by the intermediary device 100.

The embodiments of the present inventive concept described in this specification may be coupled (or mixed, combined, merged) with various methods.

Figure 10:
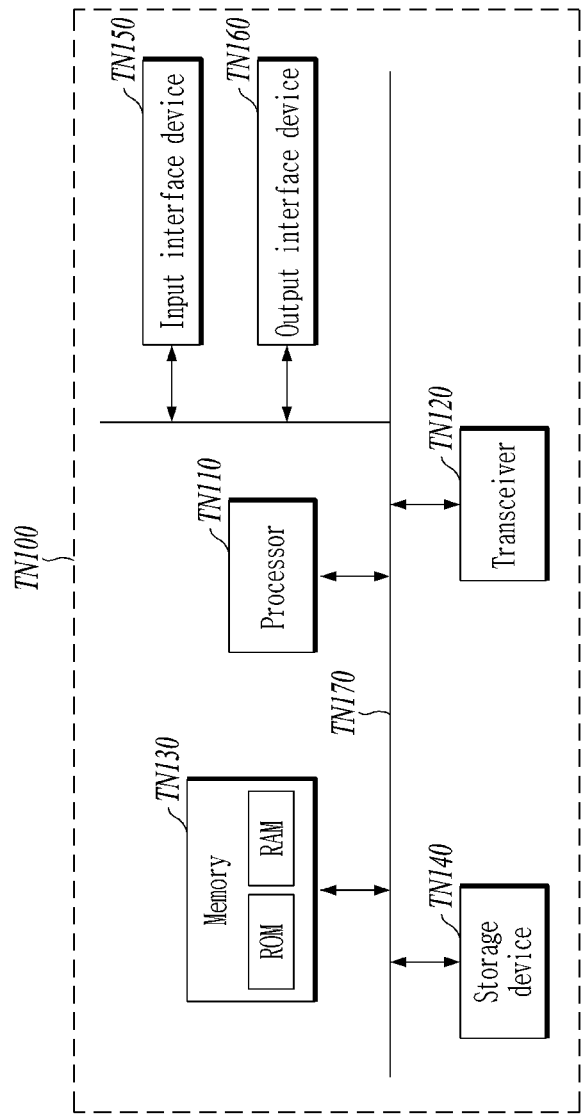
FIG. 10 is a diagram illustrating a computing device according to an embodiment of the present inventive concept.

FIG. 10 is a diagram illustrating a computing device according to an embodiment of the present inventive concept. A computing device TN100 of FIG. 10 may be a device (e.g., a sale terminal device 150, a purchase terminal device 160, an intermediary device 100) described in the present specification.

In the embodiment of FIG. 10, the computing device TN100 may include at least one processor TN 110, a transceiver TN 120, and a memory TN 130. Further, the computing device TN100 may further include a storage device TN140, an input interface device TN150, and an output interface device TN160. Components included in the computing device TN100 may be connected by a bus TN170 and communicate with each other.

The processor TN110 may execute a program command stored in at least one of the memory TN130 and the storage device TN140. The processor TN110 may mean a central processing unit (CPU), a graphics processing unit (GPU), or a dedicated processor on which methods according to embodiments of the present inventive concept are performed. The processor TN110 may be configured to implement procedures, functions, methods, and the like described in connection with the embodiments of the present inventive concept. The processor TN110 may control each component of the computing device TN100.

Each of the memory TN130 and the storage device TN140 may store various information related to an operation of the processor TN110. Each of the memory TN130 and the storage device TN140 may be configured with at least one of a volatile storage medium and a non-volatile storage medium. For example, the memory TN130 may be configured with at least one of a read only memory (ROM) and a random access memory (RAM).

The transceiver (transmitting and receiving device) TN120 may transmit or receive a wired signal or a wireless signal. The transceiver TN120 may be connected to a network to perform communication.

An embodiment of the present inventive concept may not only be embodied through the above-described apparatus and/or method but may also be embodied through a program that executes a function corresponding to a configuration of the embodiment of the present inventive concept or through a recording medium on which the program is recorded and can be easily embodied by a person of ordinary skill in the art from a description of the foregoing embodiment.

While the present inventive concept has been described in terms of several preferred embodiments, these embodiments are illustrative and not restrictive. It will be understood by those skilled in the art that various changes and modifications may be made without departing from the spirit of the present inventive concept and the scope of the appended claims.

What is claimed is:

1. A system for mediating a transaction of used heavy equipment, the system comprising:
   a sale terminal device for transmitting heavy equipment sales request information comprising at least one of a nameplate image and a registration certificate image of heavy equipment to be sold, an appearance image, first heavy equipment information, heavy equipment location information, and a desired sale price, wherein, when customer information is registered by the sale terminal device, a sales agent agreement is set after verifying the real name of a customer;
   a purchase terminal device for transmitting search information and purchase request information about the heavy equipment; and
   an intermediary device functionally connected to the sale terminal device and the purchase terminal device,
   wherein the intermediary device:
      provides a semitransparent photographing guideline comprising guidance on a photographing portion and a photographing angle on a heavy equipment portion basis to the sale terminal device in order to photograph at least one of the nameplate image and the registration certificate image and the appearance image,
      recognizes at least one of the nameplate image and the registration certificate image to extract second heavy equipment information when the heavy equipment sales request information is received, and compares the first heavy equipment information and the second heavy equipment information to authenticate the first heavy equipment information,
      calculates an estimated sale price in which a commission and a tax are added to the desired sale price when the first heavy equipment information is successfully authenticated, generates heavy equipment sales information including the first heavy equipment information, at least one of the nameplate image and the registration certificate image, the appearance image, the heavy equipment location information, and the estimated sale price, and registers the generated heavy equipment sales information in a database of a corresponding category,
      provides sales information of heavy equipment corresponding to the search information through the database when the search information is received, transmits the received purchase request information to the sale terminal device when the purchase request information is received, and processes a heavy equipment transaction result of the sale terminal device and the purchase terminal device,
      adjusts a seller rating given to the sale terminal device according to an amount of information provided from the sale terminal device for heavy equipment sale,
      analyzes information of a terminal device accessing the intermediary device and identifies whether the accessing terminal device is the sale terminal device or the purchase terminal device,
      if the accessing terminal device is the purchase terminal device, provides a first screen including a search area and a sales information area to the accessing terminal device,
      transmits heavy equipment sales information on the heavy equipment selected by the accessing terminal device among the heavy equipment searched through the search area to the accessing terminal device in order to display the information on a second screen,
   wherein the accessing terminal device displays the heavy equipment sales information on the selected heavy equipment on the second screen,
   wherein the search area includes a heavy equipment name search area using the method of arranging heavy equipment according to demand, a manufacturing company search area for searching a manufacturing company of heavy equipment, a production year search area for searching the year of production of heavy equipment, and a heavy equipment location search area for searching the city where heavy equipment is located,
   wherein the sales information area includes a heavy equipment image area displaying images on the heavy equipment searched through the search area, a heavy equipment information area displaying heavy equipment information on the searched heavy equipment, and a sales price area displaying the sales price for the searched heavy equipment,
   wherein an image area of the second screen includes a first area displaying thumbnail images on the selected heavy equipment and a second area displaying selected thumbnail images selected from the thumbnail images in an expanded view,
   wherein an information area of the second screen displays the heavy equipment name, a manufacturing company, production year, heavy equipment location, a period of using heavy equipment, sales price, and seller information regarding the selected heavy equipment, and if heavy equipment adding information is selected by the purchase terminal device, searches sales heavy equipment of other intermediary devices linked to the intermediary device and transmits the results to the purchase terminal device in order to display fitted to the first screen, and transmits detailed sales information of the heavy equipment selected by the purchase terminal device among the heavy equipment displayed on the first screen to the purchase terminal device in order to display the information fitted to the second screen.

2. The system of claim 1, wherein the intermediary device registers purchase information in a first database when registration of the purchase information is requested from the purchase terminal device, performs comparative analysis with purchase information registered in the first database when the heavy equipment sales request information is received from the sale terminal device, and notifies the sale terminal device and the purchase terminal device to perform a heavy equipment transaction procedure, when purchase information corresponding to the received heavy equipment sales request information exists in the first database.

3. A method in which an intermediate device mediates a transaction of used heavy equipment, the method comprising:

analyzing information of a terminal device accessing the intermediary device and identifying whether the accessing terminal device is a sale terminal device or a purchase terminal device;

providing a semitransparent photographing guideline comprising guidance on a photographing portion and a photographing angle for photographing a heavy equipment image on a heavy equipment portion basis to a sale terminal device;

recognizing, when heavy equipment sales request information comprising at least one of a nameplate image and a registration certificate image of heavy equipment to be sold, an appearance image, first heavy equipment information, heavy equipment location information, and a desired sale price is received from the sale terminal device, at least one of the nameplate image and the registration certificate image to extract second heavy equipment information, and comparing the first heavy equipment information and the second heavy equipment information to authenticate the first heavy equipment information;

calculating an estimated sale price in which a commission and a tax are added to the desired sale price, when the first heavy equipment information is successfully authenticated;

generating heavy equipment sales information comprising the first heavy equipment information, at least one of the nameplate image and the registration certificate image, the appearance image, the heavy equipment location information, and the estimated sale price;

registering the generated heavy equipment sales information in a database of a corresponding category;

searching for, when search information on heavy equipment is received from a purchase terminal device, sales information of heavy equipment corresponding to the search information through the database and providing the sales information to the purchase terminal device;

transmitting, when purchase request information is received from the purchase terminal device, the received purchase request information to the sale terminal device and processing a heavy equipment transaction result between the sale terminal device and the purchase terminal device; and adjusting a seller rating given to the sale terminal device according to an amount of information provided from the sale terminal device for heavy equipment sale, wherein the step of searching includes:

if the accessing terminal device is the purchase terminal device, providing a first screen including a search area and a sales information area to the accessing terminal device, and transmitting heavy equipment sales information on the heavy equipment selected by the accessing terminal device among the heavy equipment searched through the search area to the accessing terminal device in order to display the information on a second screen; and if heavy equipment adding information is selected by the purchase terminal device, searching sales heavy equipment of other intermediary devices linked to the intermediary device and transmitting the results to the purchase terminal device in order to display fitted to the first screen, and transmitting detailed sales information of the heavy equipment selected by the purchase terminal device among the heavy equipment displayed on the first screen to the purchase terminal device in order to display the information fitted to the second screen, wherein the search area includes a heavy equipment name search area using the method of arranging heavy equipment according to demand, a manufacturing company search area for searching a manufacturing company of heavy equipment, a production year search area for searching the year of production of heavy equipment, and a heavy equipment location search area for searching the city where heavy equipment is located, wherein the sales information area includes a heavy equipment image area displaying images on the heavy equipment searched through the search area, a heavy equipment information area displaying heavy equipment information on the searched heavy equipment, and a sales price area displaying the sales price for the searched heavy equipment, wherein an image area of the second screen includes a first area displaying thumbnail images on the selected heavy equipment and a second area displaying selected thumbnail images selected from the thumbnail images in expanded view, wherein an information area of the second screen displays the heavy equipment name, a manufacturing company, production year, heavy equipment location, a period of using heavy equipment, sales price, and seller information regarding the selected heavy equipment, and wherein, when customer information is registered by the sale terminal device, a sales agent agreement is set after verifying the real name of a customer.

4. The method of claim 3, further comprising:

registering, when registration of purchase information is requested from the purchase terminal device, the purchase information in a first database;

performing, when the heavy equipment sales request information is received from the sale terminal device, comparative analysis with purchase information registered in the first database; and performing, when purchase information corresponding to the received heavy equipment sales request information exists in the first database, a notification to the sale terminal device and the purchase terminal device and performing a heavy equipment transaction procedure.

5. The method of claim 3, further comprising:
transmitting, by the intermediary device, when the purchase request information received from the purchase terminal device includes price discount request information, the price discount request information to the sale terminal device; and
transmitting, when the intermediary device receives price discount response information representing discount accept or discount rejection of the price discount request information from the sale terminal device, the price discount response information to the purchase terminal device.

6. An intermediary device for mediating a transaction of used heavy equipment, the intermediary device comprising:
a memory; and
a processor for controlling the memory,
wherein the processor:
  analyzes information of a terminal device accessing the intermediary device and identifying whether the accessing terminal device is a sale terminal device or a purchase terminal device;
  provides a semitransparent photographing guideline comprising guidance on a photographing portion and a photographing angle for photographing a heavy equipment image on a heavy equipment portion basis to a sale terminal device;
  recognizes at least one of a nameplate image and a registration certificate image to extract second heavy equipment information, when heavy equipment sales request information comprising at least one of the nameplate image and the registration certificate image of heavy equipment to be sold, an appearance image, first heavy equipment information, heavy equipment location information, and a desired sale price is received from the sale terminal device;
  compares the first heavy equipment information and the second heavy equipment information to authenticate the first heavy equipment information;
  calculates an estimated sale price in which a commission and a tax are added to the desired sale price, when the first heavy equipment information is successfully authenticated;
  generates heavy equipment sales information comprising the first heavy equipment information, at least one of the nameplate image and the registration certificate image, the appearance image, the heavy equipment location information, and the estimated sale price;
  registers the generated heavy equipment sales information in a database of a corresponding category;
  performs searching for, when search information on heavy equipment is received from a purchase terminal device, sales information of heavy equipment corresponding to the search information through the database and providing the sales information to the purchase terminal device;
  transmits, when purchase request information is received from the purchase terminal device, the received purchase request information to the sale terminal device and processes a heavy equipment transaction result between the sale terminal device and the purchase terminal device; and
  adjusts a seller rating given to the sale terminal device according to an amount of information provided from the sale terminal device for heavy equipment sale,
wherein the step of searching includes:
if the accessing terminal device is the purchase terminal device, providing a first screen including a search area and a sales information area to the accessing terminal device, and transmitting heavy equipment sales information on the heavy equipment selected by the accessing terminal device among the heavy equipment searched through the search area to the accessing terminal device in order to display the information on a second screen; and
if heavy equipment adding information is selected by the purchase terminal device, searching sales heavy equipment of other intermediary devices linked to the intermediary device and transmitting the results to the purchase terminal device in order to display fitted to the first screen, and transmitting detailed sales information of the heavy equipment selected by the purchase terminal device among the heavy equipment displayed on the first screen to the purchase terminal device in order to display the information fitted to the second screen,
wherein the search area includes a heavy equipment name search area using the method of arranging heavy equipment according to demand, a manufacturing company search area for searching a manufacturing company of heavy equipment, a production year search area for searching the year of production of heavy equipment, and a heavy equipment location search area for searching the city where heavy equipment is located,
wherein the sales information area includes a heavy equipment image area displaying images on the heavy equipment searched through the search area, a heavy equipment information area displaying heavy equipment information on the searched heavy equipment, and a sales price area displaying the sales price for the searched heavy equipment,
wherein an image area of the second screen includes a first area displaying thumbnail images on the selected heavy equipment and a second area displaying selected thumbnail images selected from the thumbnail images in expanded view,
wherein an information area of the second screen displays the heavy equipment name, a manufacturing company, production year, heavy equipment location, a period of using heavy equipment, sales price, and seller information regarding the selected heavy equipment, and
wherein, when customer information is registered by the sale terminal device, a sales agent agreement is set after verifying the real name of a customer.

* * * * *